(12) United States Patent
Ludin et al.

(10) Patent No.: US 9,926,066 B2
(45) Date of Patent: Mar. 27, 2018

(54) CORNER TENSION FITTING

(71) Applicant: The Boeing Company, Chicago, IL (US)

(72) Inventors: Douglas Ludin, Malvern, PA (US); Matthew Stauffer, Bridgeport, PA (US); Eric Schulze, Hockessin, DE (US)

(73) Assignee: The Boeing Company, Chicago, IL (US)

( * ) Notice: Subject to any disclaimer, the term of this patent is extended or adjusted under 35 U.S.C. 154(b) by 172 days.

(21) Appl. No.: 14/883,597

(22) Filed: Oct. 14, 2015

(65) Prior Publication Data

US 2017/0106964 A1  Apr. 20, 2017

(51) Int. Cl.
| | | |
|---|---|---|
| B64C 1/22 | (2006.01) | |
| B64C 1/06 | (2006.01) | |
| B64C 1/18 | (2006.01) | |
| E04B 1/19 | (2006.01) | |
| E04C 3/04 | (2006.01) | |
| B64C 1/20 | (2006.01) | |
| B64C 1/00 | (2006.01) | |

(52) U.S. Cl.
CPC ............... *B64C 1/061* (2013.01); *B64C 1/18* (2013.01); *B64C 1/20* (2013.01); *E04B 1/1903* (2013.01); *E04C 3/04* (2013.01); *B64C 2001/0072* (2013.01); *E04B 2001/1957* (2013.01); *E04B 2001/1996* (2013.01); *E04C 2003/0408* (2013.01)

(58) Field of Classification Search
CPC ......... B64C 1/061; B64C 1/18; E04B 1/1903; E04B 1/1912
See application file for complete search history.

(56) References Cited

U.S. PATENT DOCUMENTS

| | | | | |
|---|---|---|---|---|
| 4,556,592 A | * | 12/1985 | Bannink, Jr. ......... | B29C 65/601 403/2 |
| 4,671,470 A | * | 6/1987 | Jonas ................ | B29C 66/12443 244/119 |
| 5,533,693 A | * | 7/1996 | Abildskov .......... | B29C 65/5071 244/131 |

(Continued)

FOREIGN PATENT DOCUMENTS

| | | |
|---|---|---|
| DE | 102010014301 | 9/2014 |
| EP | 2441668 A2 | 4/2012 |
| WO | WO2007128997 A1 | 11/2007 |

OTHER PUBLICATIONS

European Patent Office, EESR, Application No. 16193114.2, dated Apr. 9, 2017.

*Primary Examiner* — Christopher P Ellis
*Assistant Examiner* — Michael H Wang

(57) ABSTRACT

A corner fitting may include a male fitting having a convex portion and a female fitting having a concave portion configured complementary to the convex portion. In addition, the corner fitting may include a strap having a strap radius portion and a pair of strap planar portions extending from opposite ends of the strap radius portion. The strap planar portions may be parallel to one another when the strap radius portion is clamped between the convex portion and the concave portion and the corner fitting is viewed from a side, and non-parallel to one another when the corner fitting is viewed from an end.

24 Claims, 13 Drawing Sheets

(56) References Cited

U.S. PATENT DOCUMENTS

| | | | |
|---|---|---|---|
| 5,795,094 A * | 8/1998 | McKague, Jr. | B29C 65/562 |
| | | | 403/335 |
| 7,191,982 B2 * | 3/2007 | Vetillard | B64C 1/18 |
| | | | 244/119 |
| 7,195,418 B2 * | 3/2007 | Durand | B64C 1/26 |
| | | | 403/217 |
| 7,198,691 B2 | 4/2007 | Ludin | |
| 7,338,013 B2 * | 3/2008 | Vetillard | B64C 1/18 |
| | | | 244/117 R |
| 7,413,999 B2 * | 8/2008 | Goering | B29C 70/222 |
| | | | 442/181 |
| 8,267,354 B2 * | 9/2012 | Kallinen | B64C 1/26 |
| | | | 244/131 |
| 9,096,324 B2 * | 8/2015 | Erickson | B64C 1/06 |
| 2008/0302909 A1 * | 12/2008 | Chrissos | B64D 9/00 |
| | | | 244/118.1 |
| 2010/0102171 A1 * | 4/2010 | Osorio | B64C 1/18 |
| | | | 244/129.1 |
| 2011/0097554 A1 * | 4/2011 | Kehrl | B29C 70/207 |
| | | | 428/174 |
| 2013/0114994 A1 * | 5/2013 | Grip | B64C 1/26 |
| | | | 403/41 |
| 2013/0216300 A1 * | 8/2013 | Braeutigam | B64C 1/18 |
| | | | 403/205 |
| 2014/0255082 A1 | 9/2014 | Grip et al. | |
| 2016/0333960 A1 * | 11/2016 | Stauffer | F16F 15/04 |

* cited by examiner

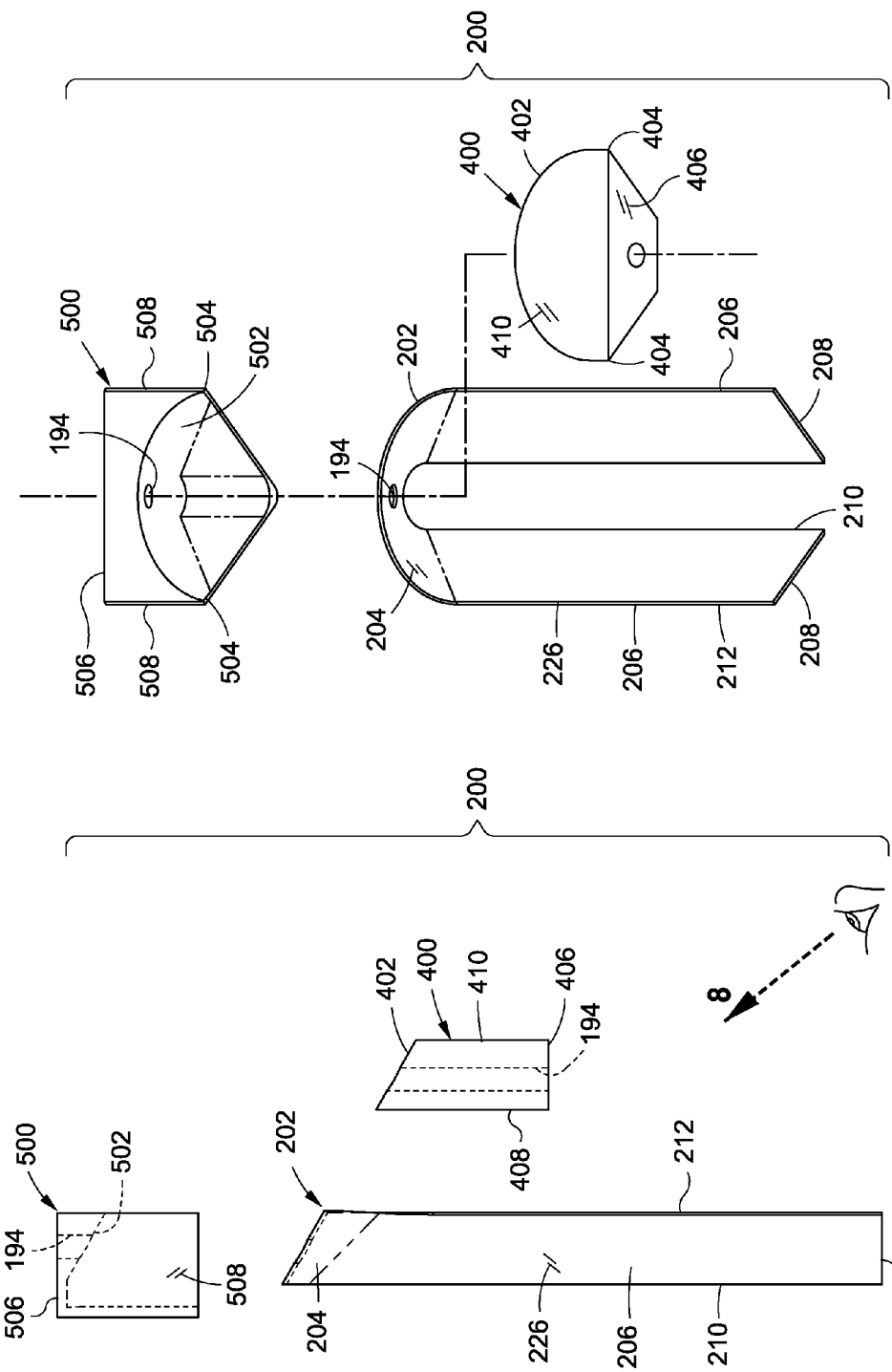

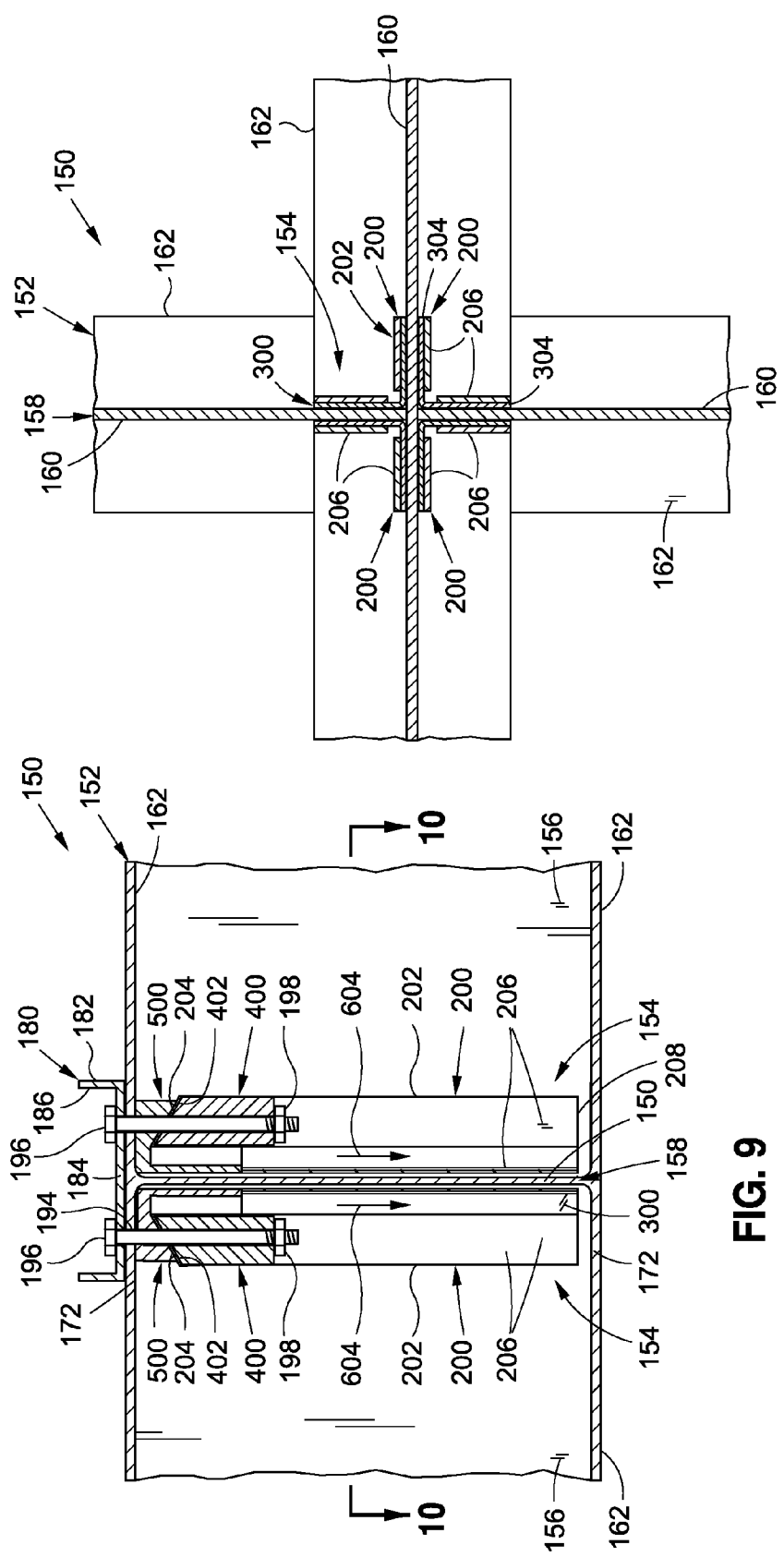

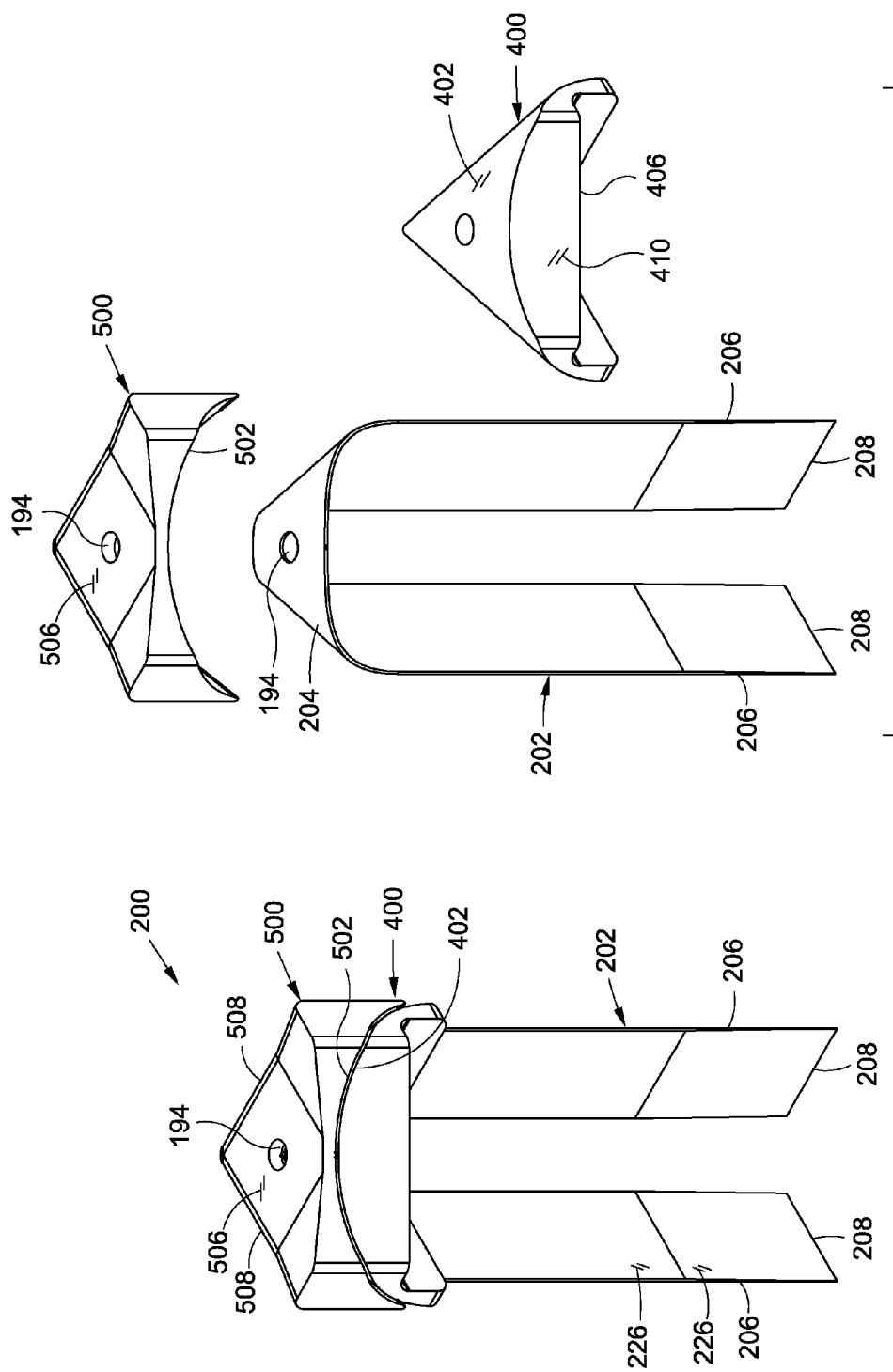

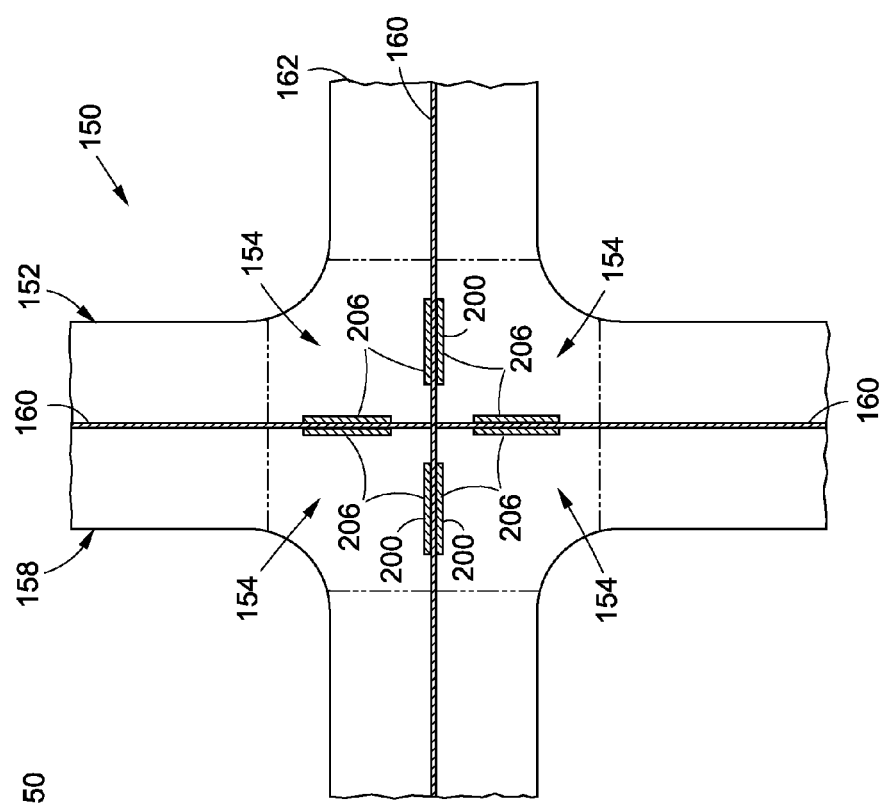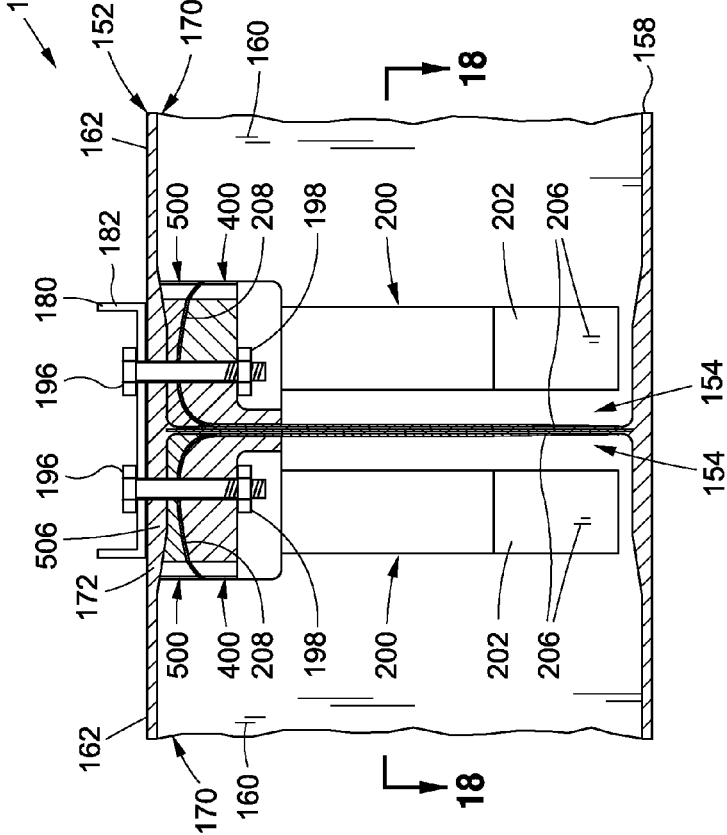

CORNER TENSION FITTING

FIELD

The present disclosure relates generally to structural assemblies and, more particularly, to a composite corner fitting for a structural assembly.

BACKGROUND

Certain types of structural assemblies require additional features for strength reinforcement of the structural assembly. For example, in an aircraft cargo hold, corner fittings may be installed at the beam joints of intersecting floor beams to reinforce the floor beams against vertical uploads imposed by cargo on the floor of the cargo hold. Such corner fittings are conventionally formed of metallic material and may be fastened to the floor beams to transfer vertical tension loads from cargo tie-downs into the vertical webs of the floor beams. Unfortunately, such metallic corner fittings are relatively heavy compared to those made from composite materials. In addition, metallic corner fittings provide minimal energy-absorbing capability in a vertical direction as may be desired in a high-strain-rate compression-loading event such as an aircraft impact event.

Structures formed of composite material are advantageous due to their high strength-to-weight ratio, favorable corrosion resistance, and high specific energy-absorbing capability during compression-loading events. A composite corner fitting may be formed by laying up composite plies comprised of reinforcing fibers embedded in a polymer matrix. Composite structures are typically designed to transmit loads along the length of the reinforcing fibers. Loads from one fiber may be transferred to another fiber in the same layer or to fibers in an adjacent layer by passing through the matrix material. However, the matrix is typically weaker than the fibers such that when a sufficiently-high load is placed on the composite structure in an out-of-plane direction or in a direction non-parallel to the fibers, the matrix may fail.

In conventional composite structures, the composite plies are typically aligned with and define the outer geometry of the structure. Unfortunately, a composite structure may be subjected to loads that are oriented non-parallel to the fibers and/or in an out-of-plane direction relative to the plane of the composite plies. Such non-parallel and out-of-plane loads may result in interlaminar tension effects that may exceed the load-carrying capability of the composite structure. In order to avoid overloading the composite structure, additional composite plies may be required which may increase the weight and complexity of the composite structure.

As can be seen, there exists a need in the art for a composite corner fitting capable of efficiently transferring tension load into a web of a beam while avoiding interlaminar tension effects in the corner fitting.

SUMMARY

The above-noted needs associated with corner fittings are specifically addressed and alleviated by the present disclosure which provides a corner fitting including a male fitting having a convex portion, and a female fitting having a concave portion configured complementary to the convex portion. The corner fitting may further include a strap having a strap radius portion and a pair of strap planar portions extending from opposite ends of the strap radius portion. The strap planar portions may be parallel to one another when the strap radius portion is clamped between the convex portion and the concave portion and the corner fitting is viewed from a side, and the strap planar portions may be non-parallel to one another when the corner fitting is viewed from an end.

Also disclosed is a structural assembly including a beam assembly having two or more beams intersecting one another forming a beam assembly corner. The beams may each have a web and at least one flange such as an upper flange and a lower flange. The structural assembly may include a corner fitting installed in the beam assembly corner. The corner fitting may include a male fitting having a convex portion, and a female fitting having a concave portion configured complementary to the convex portion. The corner fitting may further include a strap having a strap radius portion and a pair of strap planar portions extending from opposite ends of the strap radius portion. The strap planar portions may be parallel to one another when the strap radius portion is clamped between the convex portion and the concave portion and the corner fitting is viewed from a side, and the strap planar portions may be non-parallel to one another when the corner fitting is viewed from an end. The structural assembly may further include a tension fastener extending through the male fitting, the strap radius portion, and the female fitting and into a flange of at least one of the beams. The tension fastener may be oriented substantially parallel to the web of the beams.

In addition, disclosed is a method of forming a structural assembly including the step of assembling a corner fitting by sandwiching a strap radius portion of a strap between a convex portion of a male fitting and a concave portion of a female fitting such that a pair of strap planar portions protrude out of the male fitting and the female fitting from opposite circumferential ends of the convex portion and concave portion. The strap planar portions may be parallel to one another when viewed from a side and non-parallel to one another when viewed from an end. The method may additionally include installing the corner fitting in a structural assembly corner defined by intersecting beams, and extending a tension fastener through the male fitting, the strap radius portion, the female fitting and at least one flange of the intersecting beams. The method may also include coupling the pair of strap planar portions to a respective pair of webs of the intersecting beams.

The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numbers refer to like parts throughout and wherein:

FIG. 7 is an exploded side view of the corner fitting of FIG. 5;

FIG. 8 is an exploded perspective view of the corner fitting taken along line 8 of FIG. 7;

FIG. 9 is a longitudinal sectional view of the structural assembly taken along line 9 of FIG. 3 and illustrating corner fittings installed on opposite sides of a beam;

FIG. 10 is a transverse sectional view of the structural assembly taken along line 10 of FIG. 9 and illustrating the strap and the wrap of the corner assemblies coupled to the webs of the structural assembly;

FIG. 13 is a perspective view of an example of a corner fitting comprised of a strap clamped between a male fitting and a female fitting;

FIG. 14 is an exploded perspective view of the corner fitting of FIG. 13;

FIG. 17 is a longitudinal sectional view of the structural assembly taken along line 17 of FIG. 11;

FIG. 18 is a transverse sectional view of the structural assembly taken along line 18 of FIG. 17 and illustrating straps of each one of the corner fittings coupled to the webs of the beam angle segments;

DETAILED DESCRIPTION

Figure 1:
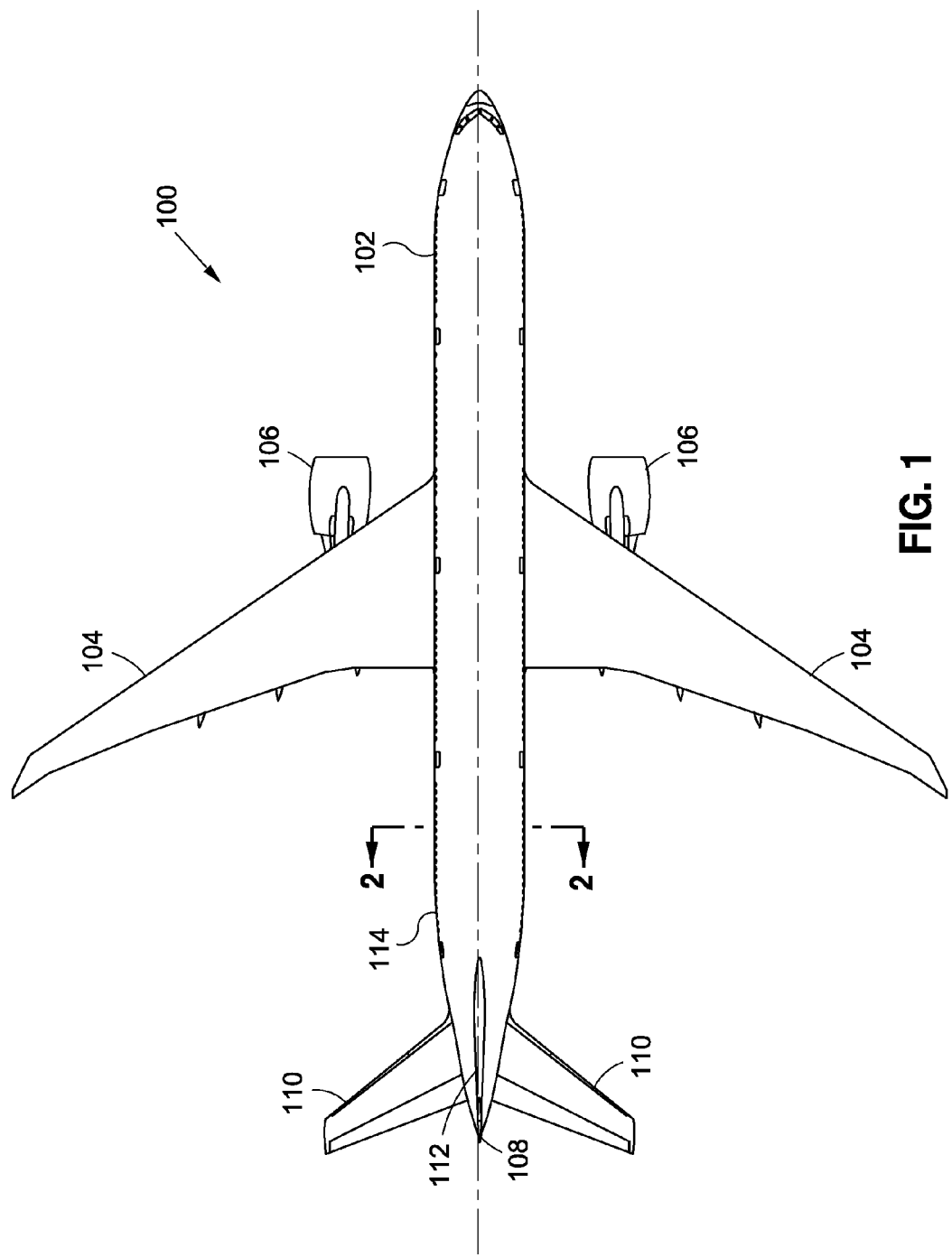
FIG. 1 is a plan view of an aircraft.

Referring now to the drawings wherein the showings are for purposes of illustrating various embodiments of the present disclosure, shown in FIG. 1 is a plan view of an aircraft 100 which may incorporate one or more corner fittings 200 (FIG. 5) as disclosed herein. The aircraft 100 may include a fuselage 102 having a nose and an empennage 108. The empennage 108 may include one or more horizontal tails 110 and a vertical tail 112. The aircraft 100 may include wings 104 extending outwardly from the fuselage 102 and may include one or more propulsion units 106 which may be supported by the wings 104.

Figure 2:
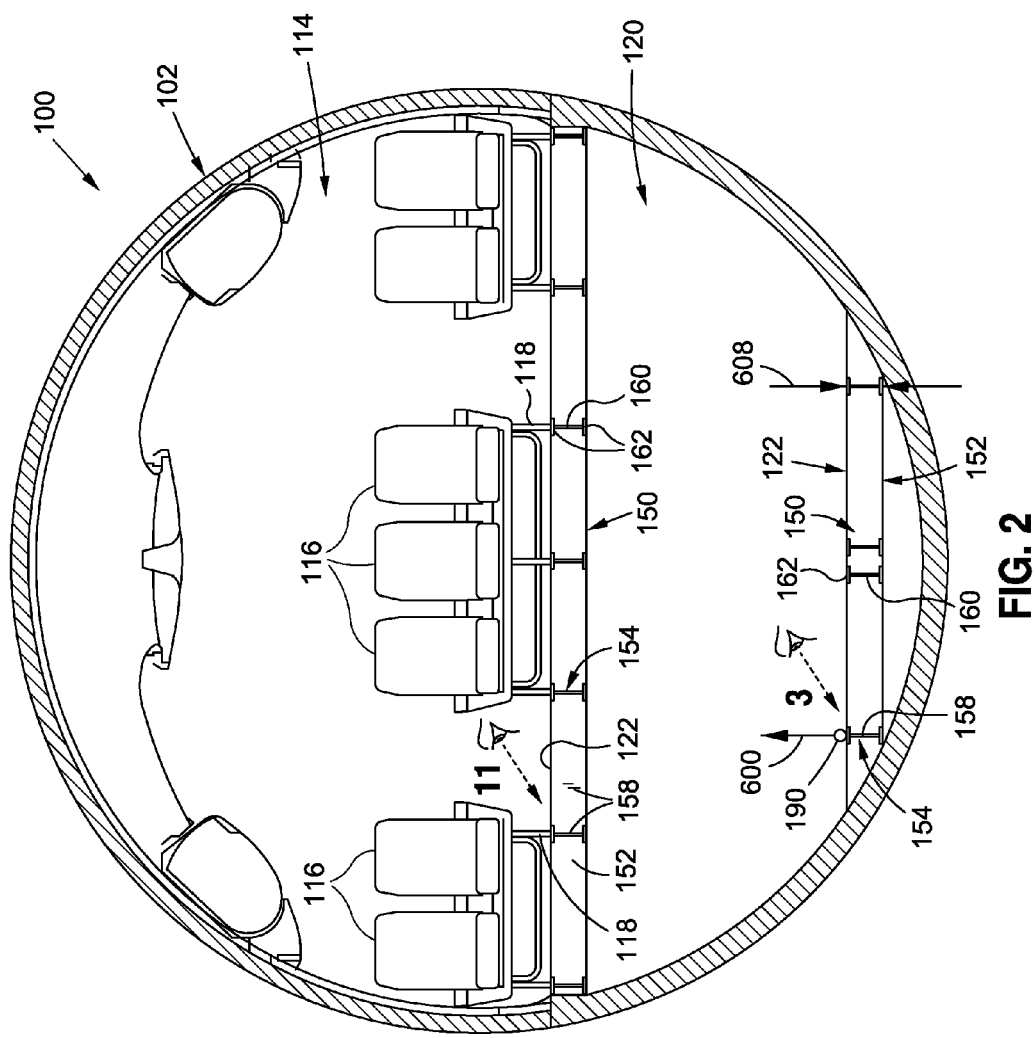
FIG. 2 is a sectional view of a fuselage of the aircraft taken along line 2 of FIG. 1.

FIG. 2 is a sectional view of the fuselage 102 of the aircraft 100 of FIG. 1. The fuselage 102 may include a passenger cabin 114 and/or a cargo hold 120. The passenger cabin 114 may include a plurality of passenger seats 116 supported by seat posts 118 which may be mounted to a floor 122 of the cabin 114. The seat posts 118 may be secured to the floor 122 in a manner preventing lateral movement and vertically-upward movement of the seats 116 such as during flight. The cargo hold 120 may include a floor 122 configured to support freight containers (not shown) which may be secured to the floor 122 of the cargo hold 120 by one or more cargo fittings (not shown) such as cargo tie-down rings 190 to prevent lateral and vertically-upward movement of the freight containers during flight.

Figure 3:
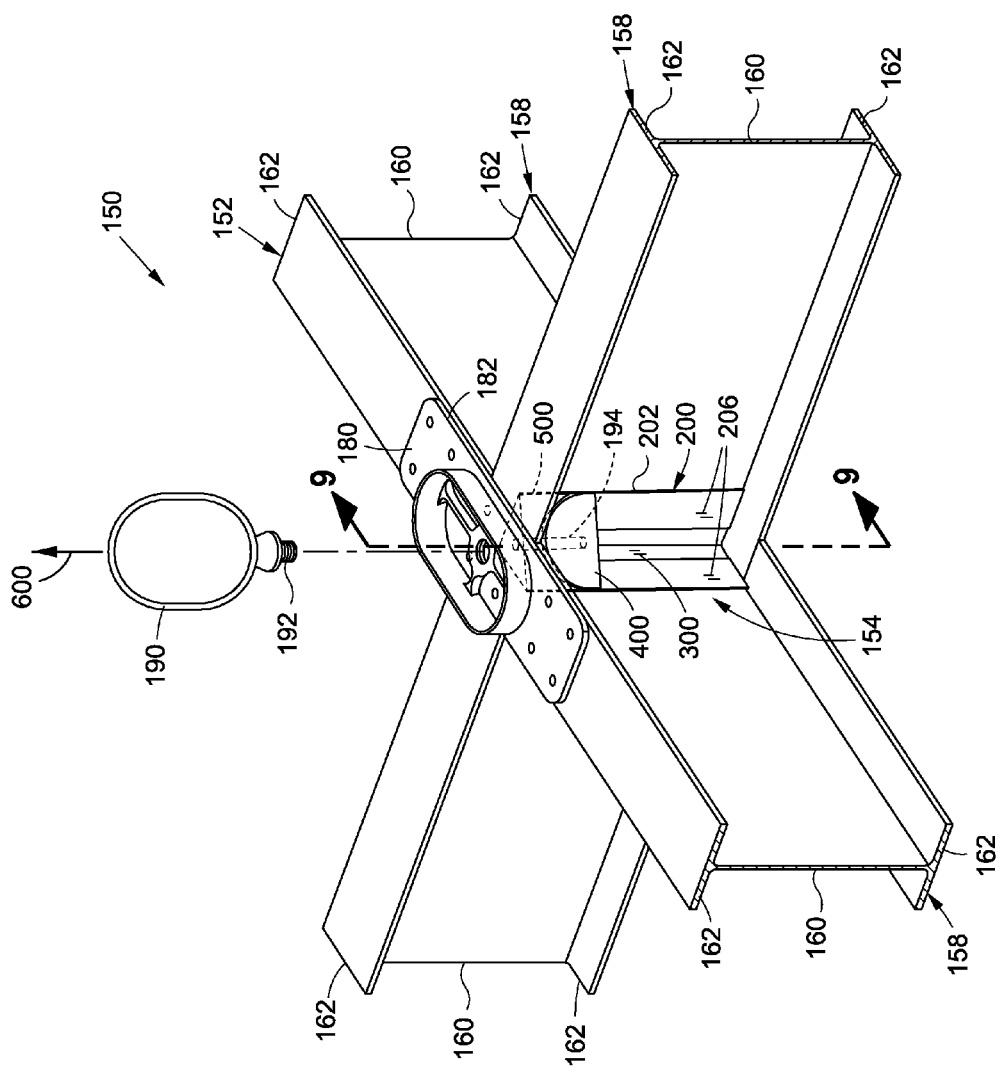
FIG. 3 is a perspective view of a structural assembly comprising intersecting beams and including one or more corner fittings installed within corresponding structural assembly corners of the intersecting beams.

In FIG. 2, the floor 122 of the cabin 114 and the floor 122 of the cargo hold 120 may be supported by a structural assembly 150 which may comprise a plurality of floor beams 158 forming a beam assembly 152. The beam assembly 152 may include longitudinal floor beams extending along a lengthwise direction (e.g., a forward-aft direction) of the fuselage 102, and transverse floor beams extending across a width of the fuselage 102. In the example shown, the floor beams 158 may be configured as I-beams each having upper and lower flanges 162 (FIG. 3) interconnected by a vertical web 160 (FIG. 3). At the intersections of the beams 158, structural assembly corners 154 (FIG. 3) may be formed.

Advantageously, one or more examples of the presently-disclosed corner fittings 200 (FIG. 3) may be installed in one or more of the structural assembly corners 154 (FIG. 3) to interconnect two or more structural members (e.g., two or more intersecting beams 158). The presently-disclosed corner fittings 200 may improve the load-carrying capability of the beam assembly 152. In this regard, the corner fittings 200 may efficiently transfer relatively high tension loads 600 (FIGS. 2-3) into the structural assembly 150 by shearing the tension load 600 into vertical webs 160 (FIG. 3) of the beams 158, as described in greater detail below. Such high tension loads 600 may occur as a result of vertically-upward loads imposed by the seats 116 (FIG. 2) and occupants on the seat post/floor connections during flight maneuvering or as a result of turbulence. In the cargo hold 120, tension loads 600 may occur as a result of vertically-upward loads imposed by the freight containers (not shown) on the cargo tie-down/floor connections during flight. The corner fittings 200 may also improve the ability of the structural assembly 150 to react against crushing loads as may occur when a relatively high-strain-rate compression load 608 (FIG. 2) oriented parallel to the webs 160 is applied to the structural assembly 150. In some examples, the corner fittings 200 may be formed of fiber-reinforced polymer matrix material (e.g., composite material) to provide an increased level of energy-absorbing capability to the structural assembly 150 during such high-strain-rate compression-loading 608 as may occur during an aircraft impact event, and may thereby provide improved protection for passengers and cargo relative to the reduced amount of protection provide by conventional metallic corner fittings (not shown).

Although the presently-disclosed corner fittings 200 are described in the context of a beam assembly 152 of an aircraft 100 floor 122, the corner fittings 200 may be installed in any type of structural assembly 150 where it is desirable to transfer tension loads 600 into structural members, such as transferring tension loads 600 into the webs 160 of beams 158 of a beam assembly. The corner fittings 200 may be incorporated into structural assemblies 150 of any type of vehicle, and are not limited to installation in an aircraft 100. In this regard, the corner fittings 200 may be incorporated into the structural assembly 150 of any type of land-based vehicle, marine vessel, air vehicle, and/or space vehicle. In addition, the corner fittings 200 may be installed in any type of non-vehicular application including stationary objects such as buildings and other types of structural assemblies, subassemblies, and systems.

FIG. 3 is a perspective view of an example of a structural assembly 150 formed of intersecting beams 158 and including one or more corner fittings 200 installed within the corresponding structural assembly corners 154 of the intersecting beams 158. In the example shown, the beams 158 are configured as I-beams each having horizontal upper and lower flanges 162 interconnected by a vertical web 160. In an embodiment, the structural assembly 150 may include a continuous beam and a pair of beam segments intersecting the continuous beam on opposite sides of the continuous beam. In one example, the beams 158 may be formed of uncured composite material that may be co-cured or co-bonded with the composite corner fittings 200 as described below. Alternatively, the beams 158 may be formed of metallic material and the corner fittings 200 may be adhesively bonded and/or mechanically fastened to the beams 158.

FIG. 3 shows an external fitting 180 mounted on top of the beam assembly 152. The external fitting 180 may be configured as a bathtub fitting 182, although any one of a variety of different types of external fittings 180 may be mounted to the beam assembly 152. In the example shown, the bathtub fitting 182 may be mechanically fastened and/or adhesively bonded to the upper flanges 162 of one or more of the intersecting beams 158. A cargo tie-down ring 190 may be coupled to the bathtub fitting 182 such as by threadably engaging a threaded stud 192 of the tie-down ring 190 to a threaded central hole 188 in the bathtub fitting 182. The bathtub fitting 182 may include a bathtub fitting base wall 184 and a vertically-oriented bathtub fitting side wall 186 extending around the bathtub fitting 182. The bathtub fitting side wall 186 may be sized to receive the cargo tie-down ring 190 when the tie-down ring 190 is placed in a folded position (not shown). One or more tension fastener holes 194 may be formed in the bathtub fitting base wall 184 at spaced locations surrounding the central hole 188. The tension fastener holes 194 may extend through one or more of the flanges 162 of the beams 158.

Figure 4:
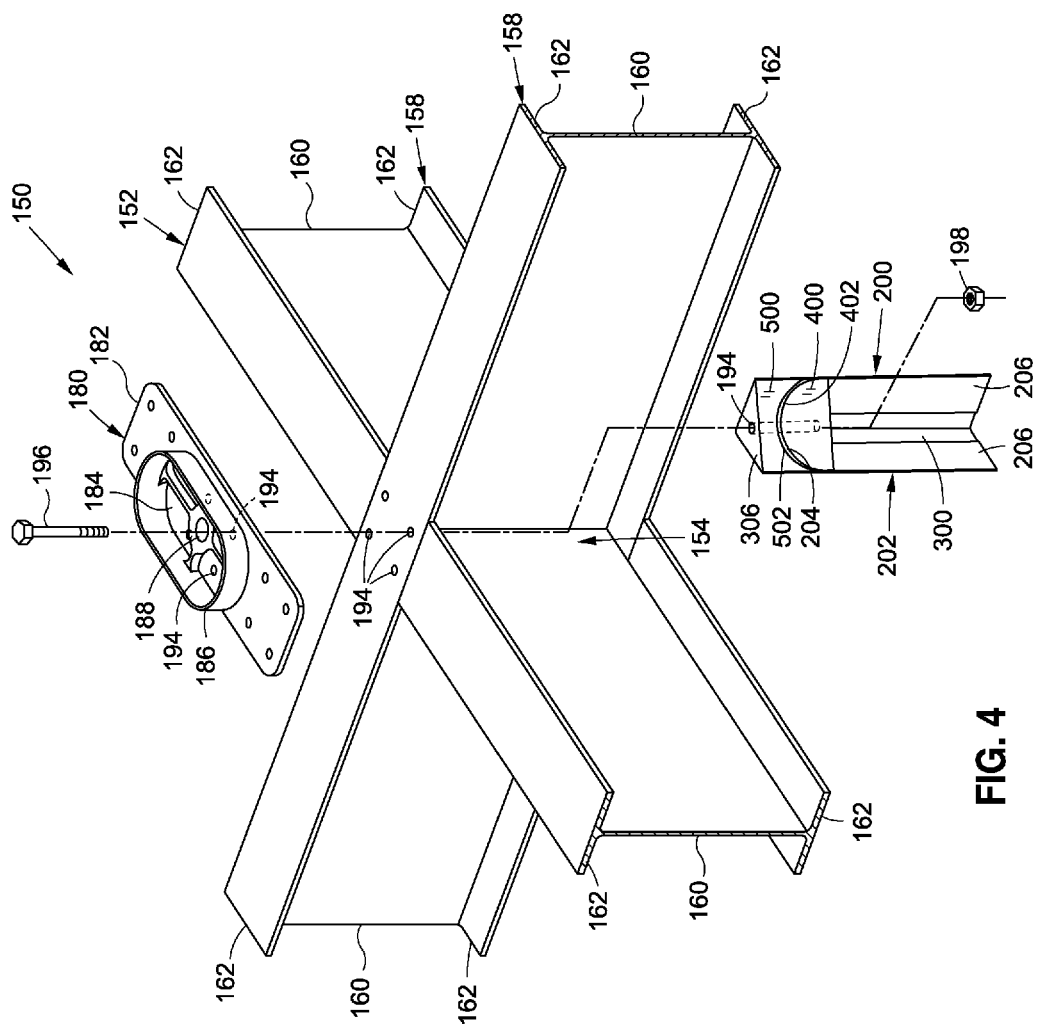
FIG. 4 is an exploded perspective view of the structural assembly of FIG. 3 and illustrating a corner fitting for installation within a structural assembly corner.

FIG. 4 is an exploded perspective view of the structural assembly 150 of FIG. 3 and illustrates a corner fitting 200 for installation within a structural assembly corner 154. As described in greater detail below, each corner fitting 200 may be comprised of a male fitting 400, a female fitting 500, and an elongate strap 202. The corner fitting 200 may optionally include a wrap 300 (FIG. 6) having an L-shaped cross-section. The strap 202 may include a strap radius portion 204 (FIG. 6) and a pair of strap planar portions 206 (FIG. 6) extending from opposite ends of the strap radius portion 204. In some examples, the wrap 300 (FIG. 6) which may be interleaved with or overlaid on the strap planar portions 206.

As shown in FIG. 4, at least one tension fastener hole 194 may be formed in the male fitting 400, female fitting 500 and strap radius portion 204 for receiving a tension fastener 196 for coupling the corner fitting 200 to the flange 162 of the beam 158 and/or to the external fitting 180 (e.g., a bathtub fitting 182) that may be mounted to (e.g., on top of) the structural assembly 150. The tension fastener 196 may transfer an upward tension load 600 (FIG. 3) from the tie-down ring 190 (FIG. 3) to the corner fitting 200. The strap planar portions 206 may shear the tension load 600 into the webs 160 of the beams 158. As mentioned above, the corner fitting 200 may optionally include a wrap 300 (FIG. 6) to interconnect and mechanically stabilize the pair of strap planar portions 206. The wrap 300 may also interconnect the webs 160 of the intersecting beams 158 and thereby increase the mechanical stability of the joint between the intersecting beams 158 by preventing relative movement of the intersecting beams 158.

Figures 5, 6:
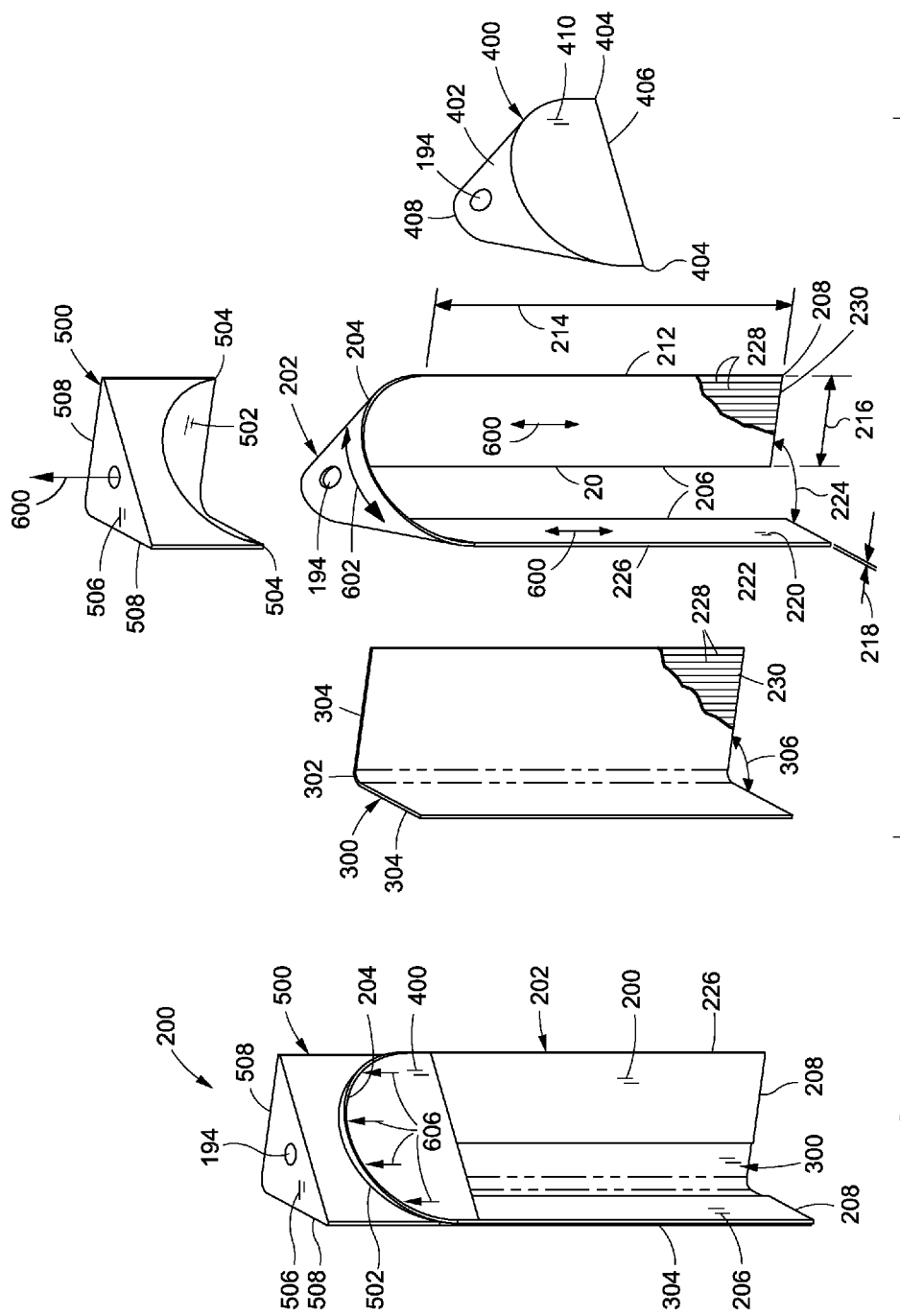
FIG. 5 is a perspective view of the corner fitting of FIG. 4.
FIG. 6 is an exploded perspective view of the corner fitting of FIG. 5 and illustrating a wrap which may be included with the corner fitting.

FIG. 5 is a perspective view of the corner fitting 200 of FIG. 4 showing the male fitting 400, the female fitting 500, the strap 202, and the wrap 300. FIG. 6 is an exploded perspective view of the corner fitting 200 of FIG. 5. The male fitting 400 may include a convex portion 402 (FIG. 6) and a male fitting end face 406 located opposite the convex portion 402. The female fitting 500 may include a concave portion 502 (FIG. 6) and a female fitting end face 506 located opposite the concave portion 502. The concave portion 502 of the female fitting 500 may be sized and shaped complementary to the convex portion 402 of the male portion. For example, the radius of curvature of the convex portion 402 may be complementary to the radius of curvature of the concave portion 502, and may accommodate the strap thickness 218 (FIG. 6) of the strap radius portion 204 when clamped between the concave portion 502 and the convex portion 402.

As shown in FIG. 6, the strap radius portion 204 may have a semi-conical shape forming a 180° arc when the strap radius portion 204 is clamped or sandwiched between the convex portion 402 and the concave portion 502. The pair of strap planar portions 206 may protrude outwardly in the same direction from opposing circumferential ends 404, 504 of the convex portion 402 and concave portion 502 when the strap radius portion 204 is clamped between the convex portion 402 and the concave portion 502. The strap planar portions 206 may be parallel to one another when the corner fitting 200 is viewed from the side (FIG. 7) or front (FIG. 8). The strap planar portions 206 may be non-parallel to one another when the corner fitting 200 is viewed from an end or when the strap planar portions 206 are viewed in transverse cross-section as shown in FIG. 10 which illustrates the plane of each strap planar portion 206 being parallel to the plane of a respective web 160 to which the strap planar portion 206 is coupled.

In FIG. 6, each one of the strap planar portions 206 may have a strap planar portion length 214 and a strap planar portion width 216. The strap planar portion length 214 may be defined as the distance between a strap end edge 208 and the point along the strap inner side edge 210 where the strap planar portion 206 is tangent to the strap radius portion 204. The strap planar portion width 216 may be defined as the distance from the strap inner side edge 210 to the strap outer side edge 212. In the example shown, the pair of strap planar portions 206 may have the same strap planar portion length 214 and the same strap planar portion width 216. However, in other examples, the pair of strap planar portions 206 may have dissimilar strap planar portion lengths 214 and/or dissimilar strap planar portion widths 216. The strap planar portion length 214 and the strap planar portion width 216 may be sized to provide an amount of surface area of the strap planar portion 206 such that when the strap planar portion 206 is coupled, bonded, co-bonded, or co-cured to a web 160, the shear stress at the interface between the strap planar portion 206 and the web 160 is less than the allowable shear stress of the resin and/or the adhesive joining the strap planar portion 206 to the web 160.

In FIG. 6, the corner fitting 200 may be configured such that the strap planar portions 206 define a strap interior angle 224 that is complementary to the corner interior angle 156 (FIG. 10) of the structural assembly corner 154 (FIG. 10) into which the corner fitting 200 is to be installed. The strap interior angle 224 may be such that each one of the strap planar portions 206 is parallel to a respective web 160 (FIG. 10) when the corner fitting 200 is installed in a structural assembly corner 154. In some examples, the strap planar portions 206 may define a 90° strap interior angle 224 which may be complementary to a 90° corner interior angle 156 (FIG. 10) of the structural assembly corner 154. A 90° corner interior angle 156 may be formed in a structural assembly 150 having intersecting beams 158 that are perpendicular to one another. However, the corner fitting 200 may be configured such that the strap planar portions 206 define a non-90° corner interior angle (not shown) to allow the corner fitting 200 to be installed in a structural assembly corner 154 having non-90° corner interior angle.

Referring to FIGS. 5-8, the convex portion 402 of the male fitting 400 and the concave portion 502 of the female fitting 500 are each formed in a semi-conical shape such that when the strap radius portion 204 is clamped between the convex portion 402 and concave portion 502, the semi-conical shape causes the strap planar portions 206 to assume the strap interior angle 224 (e.g., when viewed from the end or in transverse cross-section) that substantially (e.g., within ±5°) matches the corner interior angle 156 (FIG. 10) of the structural assembly corner 154 (FIG. 10) into which the corner fitting 200 may be installed. However, the corner fitting 200 is not limited to a semi-conical shape in the convex portion 402 and concave portion 502, and may include any type of single-curvature shape (not shown) of the convex portion 402 and concave portion 502 that results in the strap planar portions 206 defining a strap interior angle 224 that substantially matches the corner interior angle 156 of a structural assembly corner 154. In an embodiment, at any axial location along an axis of the single-curvature shape of the convex portion 402 and concave portion 502, the single-curvature shape may have a constant radius of curvature when the strap radius portion 204. Alternatively, the convex portion 402 and the concave portion 502 may have a radius of curvature that is different at different circumferential locations at a given axial location. In still further embodiments, a single-curvature shape (not shown) of the convex portion 402 and concave portion 502 may include one or more flats (not shown) formed in the concave portion 502 and/or the convex portion 402. Regardless of their shape, the convex portion 402 and concave portion 502 may be provided in a shape such that when the strap radius portion 204 is clamped between the convex portion 402 and concave portion 502, the pair of strap planar portions 206 define a strap interior angle 224 that substantially matches the corner interior angle 156 of the structural assembly corner 154 into which the corner fitting 200 may be installed.

Referring still to FIGS. 5-8, the convex portion 402 of the male fitting 400 and the concave portion 502 of the female fitting 500 may have a semi-conical shape configured such that when the strap radius portion 204 is clamped between the male fitting 400 and the female fitting 500, the length of the strap inner side edge 210 is substantially equivalent to (e.g., within 0.010 inch) the length of the strap outer side edge 212. In such an arrangement, the radius of curvature of the strap inner side edge within the strap radius portion is necessarily smaller than the radius of curvature of the strap outer side edge within the strap radius portion such that in a side view of the male fitting 400 and female fitting 500 as shown in FIG. 7, the interface between the convex portion 402 and concave portion 502 defines a profile (e.g., shown in dashed lines) that is oriented at a non-perpendicular angle relative to a lengthwise direction of the strap planar portions 206.

Referring to FIG. 6, by configuring the shape of the convex portion 402 and concave portion 502 such that the length of the strap inner side edge 210 and strap outer side edge 212 are equivalent, the strap 202 may be formed of one or more unidirectional composite plies 226 (e.g., in a ply stack—not shown) wherein the reinforcing fibers 228 of at least one of the unidirectional plies of the strap 202 are oriented parallel to the orientation of the tension fastener 196 coupling the corner fitting 200 to the beam 158 flange 162 (FIG. 3) and/or external fitting 180 (FIG. 3). In the example shown in FIG. 6, the reinforcing fibers 228 of at least one of the composite plies 226 in the strap 202 may be continuous between opposing strap end edges 208. In addition, the reinforcing fibers 228 in at least one of the composite plies 226 in the strap 202 may be oriented parallel to the lengthwise direction of the strap planar portions 206. It should be noted that although the strap 202 may be formed of unidirectional composite plies 226 having fibers oriented parallel to the lengthwise direction of the strap planar portions 206, the strap 202 may additionally include unidirectional plies oriented non-parallel to the lengthwise direction of the strap planar portions 206 (e.g., to form a quasi-isotropic layup) and/or composite plies 226 formed of woven fabric (e.g., bi-directional woven fabric—not shown) or having other ply configurations or fiber orientations.

In some examples of the corner fitting 200, the strap 202 and/or the wrap 300 may be formed of one or more composite plies 226 that are pre-impregnated with resin (e.g. prepreg composite plies 226). For example, the strap 202 and/or the wrap 300 may be formed of a plurality of prepreg composite plies 226 (e.g., prepreg unidirectional tape) to form a ply stack (not shown). The strap 202 may have a rectangular shape when viewed in flat pattern layout (not shown). As indicated above, at least a portion of the reinforcing fibers 228 in the composite plies 226 of a strap 202 may be oriented substantially parallel (e.g., within ±10 degrees) to the orientation of the tension fastener 196 and/or parallel to a lengthwise direction of the strap planar portions 206.

The tension fastener 196 may be parallel to both of the webs 160 to which the strap planar portions 206 are coupled. The strap 202 may be configured such that the reinforcing fibers 228 are oriented parallel to the strap inner side edge 210 and/or parallel to the strap outer side edge 212. For example, as indicated above, the strap 202 may have a rectangular shape when viewed in flat pattern layout wherein the strap side edges 210, 212 are straight and are perpendicular to the strap end edges 208 which are also straight. Although the presently-illustrated examples of the corner fitting 200 have strap inner side edges 210 that are parallel to the strap outer side edges 212, the strap 202 may be configured to have a strap inner side edge 210 that is non-parallel to a strap inner side edge 210 and/or non-parallel to a strap outer side edge 212. The strap inner side edge 210 and/or the strap outer side edge 212 may have a non-straight shape such as a curved shape, and are not limited to having the straight shape shown in the figures.

In some examples, the strap 202 and/or the wrap 300 may be formed of materials other than prepreg composite plies 226. For example, the strap 202 and/or the wrap 300 may be formed of metallic material (e.g., sheet metal such as stainless steel, titanium, etc.), as fiber-metal laminates (e.g., glass laminate aluminum reinforced epoxy (GLARE) or Titanium/Graphite), and/or non-prepreg composite material. In an example of non-prepreg composite material, the strap 202 and/or the wrap 300 may be formed by laying up one or more dry fiber composite plies 226 (not shown) and infusing the dry fiber composite plies 226 with resin using any one of a variety of different resin infusion processes. For example, a corner fitting 200 may be fabricated by laying up one or more dry fiber composite plies 226 to form a strap 202, clamping the strap radius portion 204 of the strap 202 between a male fitting dry fiber preform (not shown) and a female fitting dry fiber preform (not shown), and infusing the dry fiber assembly (not shown) with resin and curing while the strap planar portions 206 are maintained in a strap interior angle 224 that substantially matches the corner interior angle 156 of the structural assembly corner 154 into which the corner fitting 200 may be installed.

Referring still to FIGS. 5-8, the male fitting 400 and/or the female fitting 500 may be configured complementary to the structural assembly corner 154 (FIG. 4). As best seen in FIG. 7, the male fitting 400 may include a male fitting interior surface 408 and a male fitting exterior surface 410 which may define a thickness of the male fitting 400. The thickness of the male fitting 400 may preferably be no less than the strap planar portion width 216 at least within the strap radius portion 204. In this manner, an entirety of the area of the strap radius portion 204 may be supported by the convex portion 402 of the male fitting 400 to maximize the distribution of tension load 600 (FIG. 4) from the male fitting 400 into the strap radius portion 204.

The male fitting end face 406 may be configured to receive a head or a nut 198 (FIG. 4) or other threaded receptacle of a tension fastener 196 (FIG. 4). For example, the male fitting end face 406 may have a generally planar configuration oriented normal to the tension fastener hole 194 in the male fitting 400. However, the male fitting end face 406 may have a non-planar contour (not shown) and the area around the tension fastener hole 194 may include a spotface (not shown) to provide a smooth, flat surface against which the head or nut 198 of the tension fastener 196 may sit. It should be noted that the tension fastener 196 is not limited to a threaded bolt and nut 198 as shown in the figures, and may include any type of fastener capable of coupling the corner fitting 200 to the flange 162 (FIG. 3) and/or external fitting 180 (FIG. 3) and transferring tension load 600 (FIG. 3) from the flange 162 and/or external fitting 180 into the male fitting 400. The male fitting 400 may optionally include one or more hollow regions (not shown) in the volume bounded by the male fitting end face 406, the male fitting interior surface 408, the male fitting exterior surface 410, and the convex portion 402 as a means to reduce the weight of the male fitting 400.

In FIGS. 5-8, in some examples, the female fitting 500 may include female fitting side surfaces 508 that may be configured complementary to the structural assembly corner 154 (FIG. 4) into which the corner fitting 200 may be installed. One or both of the female fitting side surfaces 508 may be oriented parallel to the plane defined by a respective strap planar portion 206. The female fitting side surfaces 508 may define an interior angle that substantially matches the corner interior angle 156 of the structural assembly corner 154. In this regard, at least a portion of one or both of the female fitting side surfaces 508 may define a plane that may be parallel to or co-planar with the plane of the respective webs 160 (FIG. 10) against which the female fitting side surfaces 508 may be positioned. In this regard, the female fitting side surfaces 508 may be configured to nest in directly abutting contact with the respective webs 160 (FIG. 10) of the intersecting beams 158 that form the structural assembly corner 154. However, the female fitting 500 may be configured such that the female fitting side surfaces 508 are disposed in non-contacting relation with one or both of the webs 160 of the structural assembly 150 when the corner fitting 200 is installed in the structural assembly corner 154.

The female fitting end face 506 may be configured complementary to an underside of a flange 162 (FIG. 9) or other structural assembly 150 (FIG. 9) to which the corner fitting 200 is installed. In one example, at least a portion of the female fitting end face 506 (FIG. 9) may be configured to be positioned in directly abutting contact against the underside of one or more of the flanges 162 of the intersecting beams 158 of the structural assembly corner 154. In this regard, the tension fastener 196 may compress the female fitting 500 against the underside of the flange 162. The female fitting 500 may optionally include one or more hollow regions (not shown) in the volume defined by the female fitting end face 506, the female fitting side surfaces 508, and the concave portion 502 as a means to reduce the weight of the female fitting 500.

Referring still to FIGS. 5-8, in an embodiment, the male fitting 400 and/or the female fitting 500 may be formed of polymeric material such as fiber-reinforced polymer matrix material. In one example, the male fitting 400 and/or the female fitting 500 may be formed of chopped fibers (not shown) embedded in a polymer resin matrix (not shown) which may have a coefficient of thermal expansion (CTE) that is similar to the CTE of the strap 202. In another example, the male fitting 400 and/or the female fitting 500 may be formed of prepreg composite plies 226 such as a layup of prepreg woven fabric plies (not shown) or prepreg unidirectional plies (not shown). However, the male fitting 400 and/or the female fitting 500 may also be formed of non-fibrous polymeric material. In still a further embodiment, the male fitting 400 and/or the female fitting 500 may be formed of metallic material that is preferably chemically-compatible and temperature-compatible with the composite material and/or metallic material from which the strap 202 is formed.

Referring to FIG. 6, the corner fitting 200 may optionally include a wrap 300 having a pair of wrap planar portions 304 interconnected by a wrap bend radius 302. The pair of wrap planar portions 304 and the wrap bend radius 302 may collectively form an L-shaped section defining a wrap interior angle 306 when the wrap 300 is viewed in transverse cross-section (FIG. 10). The wrap interior angle 306 may substantially (e.g., within ±5°) match the strap interior angle 224 defined by the strap planar portions 206 to allow the wrap planar portions 304 to be overlaid onto and/or interleaved with the strap planar portions 206. In the example of FIG. 5, one or both of the wrap planar portions 304 may be overlaid on a strap exterior surface 222 of a respective strap planar portion 206. A strap exterior surface 222 may be defined as the surface facing a web 160 to which the strap planar portion 206 may be coupled. Alternatively, one or both of the wrap planar portions 304 may be overlaid onto a strap interior surface 220 of the strap planar portions 206 such that the strap planar portions 206 may be placed in direct, physical contact with the web 160 to facilitate direct bonding, co-bonding, co-curing, and/or mechanically fastening of the strap planar portion 206 to the web 160.

In FIG. 6, as indicated above, the corner fitting 200 may include at least one tension fastener hole 194 extending through the male fitting 400, the female fitting 500, and the strap radius portion 204 when the strap radius portion 204 is clamped between the concave portion 502 and the convex portion 402. In the example shown, the tension fastener hole 194 extends through a center or apex of the convex portion 402, the strap radius portion 204, and the concave portion 502. However, a corner fitting 200 may be provided with multiple tension fastener holes 194 extending through the male fitting 400, strap radius portion 204 and female fitting 500 at locations that may be off-center from the apex of the convex portion 402 and concave portion 502. In an example, the one or more tension fastener holes 194 may be oriented substantially parallel (e.g., ±10°) to the lengthwise direction of the strap planar portions 206 when the corner fitting 200 is viewed from the side. The tension fastener hole 194 may be sized and configured to receive a tension fastener 196 configured for transferring a tension load 600 (e.g., an upward load) from an external fitting 180 (e.g., the bathtub fitting 182) to the corner fitting 200. Alternatively, the external fitting 180 may be omitted from the structural assembly 150 and the tension fastener 196 may couple the corner fitting 200 directly to one or more of the flanges 162 of the structural assembly 150 to assist in transferring flange loads (not shown) into the webs 160.

In an example, a vertically-upward load on a cargo tie-down ring 192 (FIG. 3) may generate a tension load 600 (FIG. 3) in a tension fastener 196 (FIG. 3) coupling the external fitting 180 (FIG. 3) to the corner fitting 200. The tension load 600 in the tension fastener 196 may result in a compression load 606 (FIG. 5) in the male fitting 400 as the convex portion 402 of the male fitting 400 is compressed upwardly against the strap radius portion 204. Due to the rounded shape (e.g., semi-conical shape) of the strap radius portion 204, the compression load 606 in the male fitting 400 results in a hoop load 602 (FIG. 6) in the strap radius portion 204. The hoop load 602 in the strap radius portion 204 travels to the each one of the opposing circumferential ends of the strap radius portion 204 and becomes a tension load 600 (FIG. 6) in each strap planar portion 206. The tension load 600 in each one of the strap planar portions 206 is transferred as a shear load 604 (FIG. 9) into the respective webs 160 of the beams 158 to which the strap planar portions 206 are coupled.

FIG. 9 is a longitudinal sectional view of the structural assembly 150 taken along line 9 of FIG. 3 and illustrating corner fittings 200 installed in opposing structural assembly corners 154 on opposite sides of a beam 158. A tension fastener 196 extends through each one of the corner fittings 200 to mechanically couple the corner fitting 200 to an external fitting 180 (e.g., a bathtub fitting 182) that may be mounted on top of the structural assembly 150. However, as indicated above, the external fitting 180 may be omitted and the corner fitting 200 may be installed as a means to transfer tension load 600 (e.g., upward load) from the flange 162 to the webs 160 of the beams 158. Each corner fitting 200 includes a strap 202 having a strap radius portion 204 that is clamped between the convex portion 402 of the male fitting 400 and the concave portion 502 of the female fitting 500. The strap planar portions 206 transfer the tension load 600 from the tension fastener 196 into the respective web 160 to which each strap 202 portion is coupled. The tension load 600 in each one of the strap planar portions 206 is transferred as a shear load 604 into a respective web 160.

In FIG. 9, the strap planar portions 206 may be provided in a strap planar portion length 214 that is complementary to the height of the web 160 to which the strap planar portion 206 are coupled as a means to maximize the surface area through which the shear load 604 is transferred into the web 160. In some examples, the strap planar portion length 214 may be substantially equivalent to the height of the web 160. However, in other examples, the strap planar portion length 214 may be less than the height of the web 160. In still further examples, a strap 202 may be comprised of a plurality of composite plies 226 having different lengths. For example, some of the composite plies 226 in a strap planar portion 206 may extend along the full height of the web 160, and other composite plies 226 of the same strap planar portion 206 may extend along a portion of the height of the web 160.

FIG. 10 is a transverse sectional view of the structural assembly 150 of FIG. 9 and illustrating the strap 202 and the wrap 300 of the corner fittings 200 (FIG. 9) coupled to the webs 160 of the structural assembly 150. As indicated above, the strap 202 and the wrap 300 may each be formed of composite plies 226. In some examples, the wrap planar portions 304 may overlap the strap interior surfaces 220 such that the wrap planar portions 304 are in direct physical contact with the respective webs 160 of the beams 158. In other examples, the wrap 300 may overlap the strap exterior surfaces 222 such that the strap planar portion 206 are in direct physical contact with the respective webs 160 of the beams 158. In still further examples, multiple composite plies 226 of a strap planar portion 206 may be interleaved with multiple composite plies 226 of a wrap planar portion 304.

As described below, in one example, the male fitting 400, the female fitting 500, the strap 202, and optionally the wrap 300 may be individually formed of composite material and then assembled and co-cured as an assembly to form a cured corner fitting 200 prior to installation of the cured corner fitting 200 into a structural assembly corner 154 and co-bonding, adhesively-bonding, and/or mechanically fastening the cured strap planar portions 206 to the respective webs 160. Before or after coupling the strap planar portions 206 to the webs 160, one or more tension fasteners 196 may be extended through the male fitting 400, the strap radius portion 204 and the female fitting 500 to couple the corner fitting 200 to the beam 158 flanges 162 and/or to an external fitting 180 mounted on the flanges 162. However, in another embodiment, the male fitting 400, the female fitting 500, strap 202, and optional wrap 300 may be individually formed of composite material and cured as separate items. The separately-cured male fitting 400, female fitting 500, and strap 202, and optional wrap 300 may be assembled and/or installed in a structural assembly corner 154, as shown in FIG. 4. The separately-cured male fitting 400, female fitting 500, and strap 202, and optional wrap 300 may be either bonded together or left un-bonded. A tension fastener 196 may be installed to fasten the corner fitting 200 to the beam flanges 162 and/or to an external fitting 180 mounted on the beam 158 flanges 162. The strap planar portions 206 and optional wrap planar portions 304 may be coupled to the respective webs 160 of the beams 158 such as by co-bonding, adhesively-bonding, and/or mechanically fastening.

In still another example, the structural assembly 150 may be formed as a layup of uncured composite material (e.g., prepreg composite plies 226). Likewise, the corner fitting 200 may be formed as a layup of uncured prepreg composite plies 226 (e.g., to form the strap 202 and/or the wrap 300) and/or formed of chopped-fiber-reinforced polymer matrix material (e.g., to form the male fitting 400 and the female fitting 500), and may be installed in the structural assembly corner 154 and co-cured with the structural assembly 150. In another example, the structural assembly 150 may be provided as a precured composite structural assembly 150. The corner fitting 200 may be formed of uncured composite material and installed in a structural assembly corner 154 and co-bonded to simultaneously cure the corner fitting 200 and bond the strap planar portions 206 to the webs 160 of the structural assembly 150. A tension fastener 196 may be installed in the tension fastener hole 194 to couple the corner fitting 200 to the flange 162 of the web 160 and/or to an external fitting 180 (e.g., bathtub fitting 182) mounted on the structural assembly 150.

Figure 11:
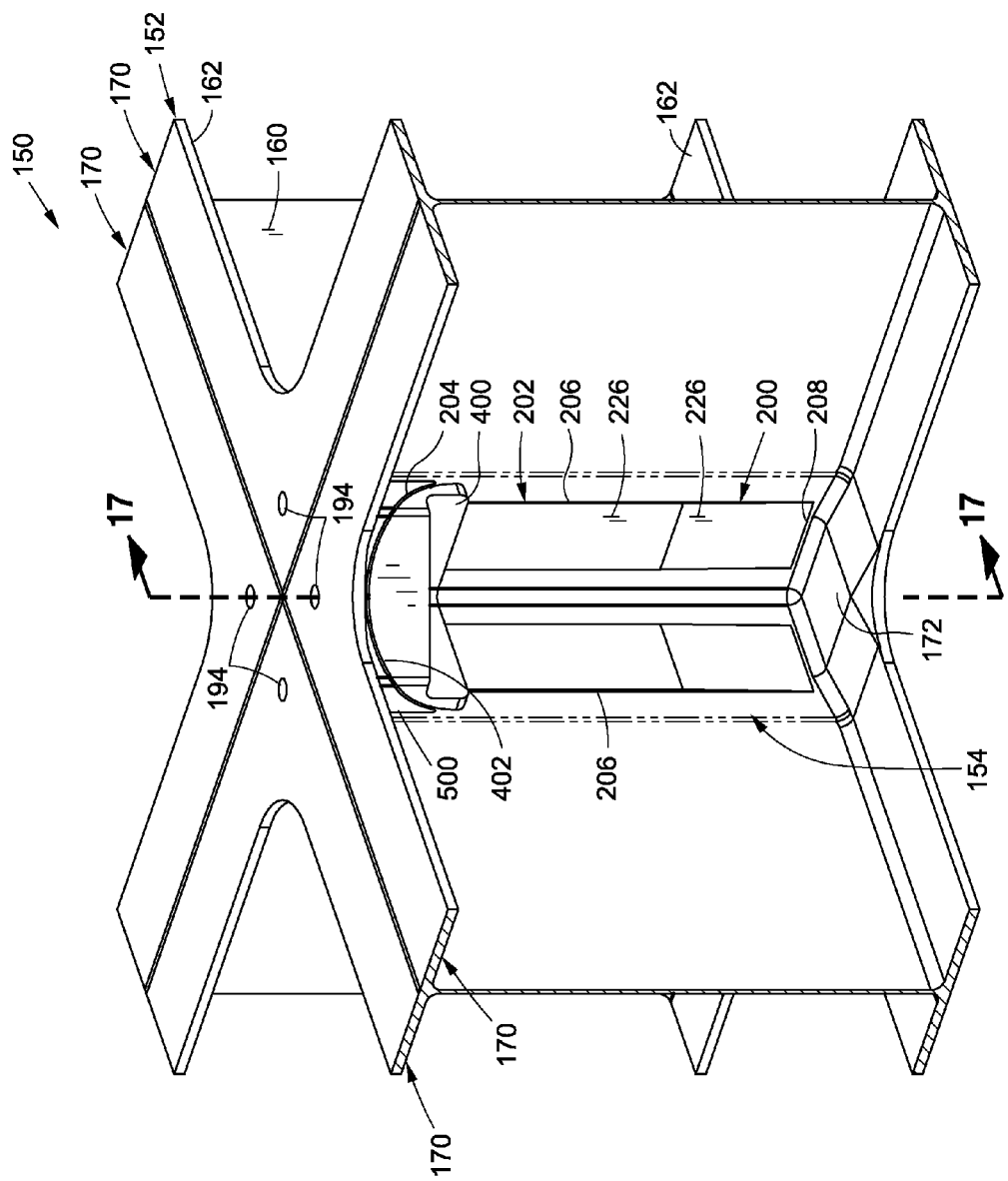
FIG. 11 is a perspective view of an example of a structural assembly formed by assembling four beam angle segments of a beam assembly and which may be reinforced by corner fittings installed in the structural assembly corners.

FIG. 11 is a perspective view of a further example of a structural assembly 150 formed by assembling four beam angle segments 170 in back-to-back relation to one another. The beam angle segments 170 may make up at least a portion of intersecting beams of a beam assembly 152. Corner fittings 200 may be installed within one or more of the structural assembly corners 154. Although not shown, an external fitting 180 may optionally be mounted on top of the structural assembly 150 such as on top of the flanges 162 of the assembled beam angle segments 170. Tension fasteners 196 may be extended through the tension fastener holes 194 formed in the flanges 162 of the beam angle segments 170 to couple the corner fittings 200 to the flanges 162 and/or to an external fitting (not shown). The beam angle segments 170 may be formed of metallic material or composite material. For example, the beam angle segments 170 may be formed of prepreg composite plies 226 and may be co-bonded or co-cured with the corner fittings 200. In the example shown, the beam angle segments 170 may include pad-ups 172 representing areas of increased thickness of the flanges 162 in the structural assembly corners 154. The pad-ups 172 in a composite beam angle segment 170 may result from overlapping continuous composite plies (not shown) of the intersecting flanges 162 when laying up the composite beam angle segment 170

Figure 12:
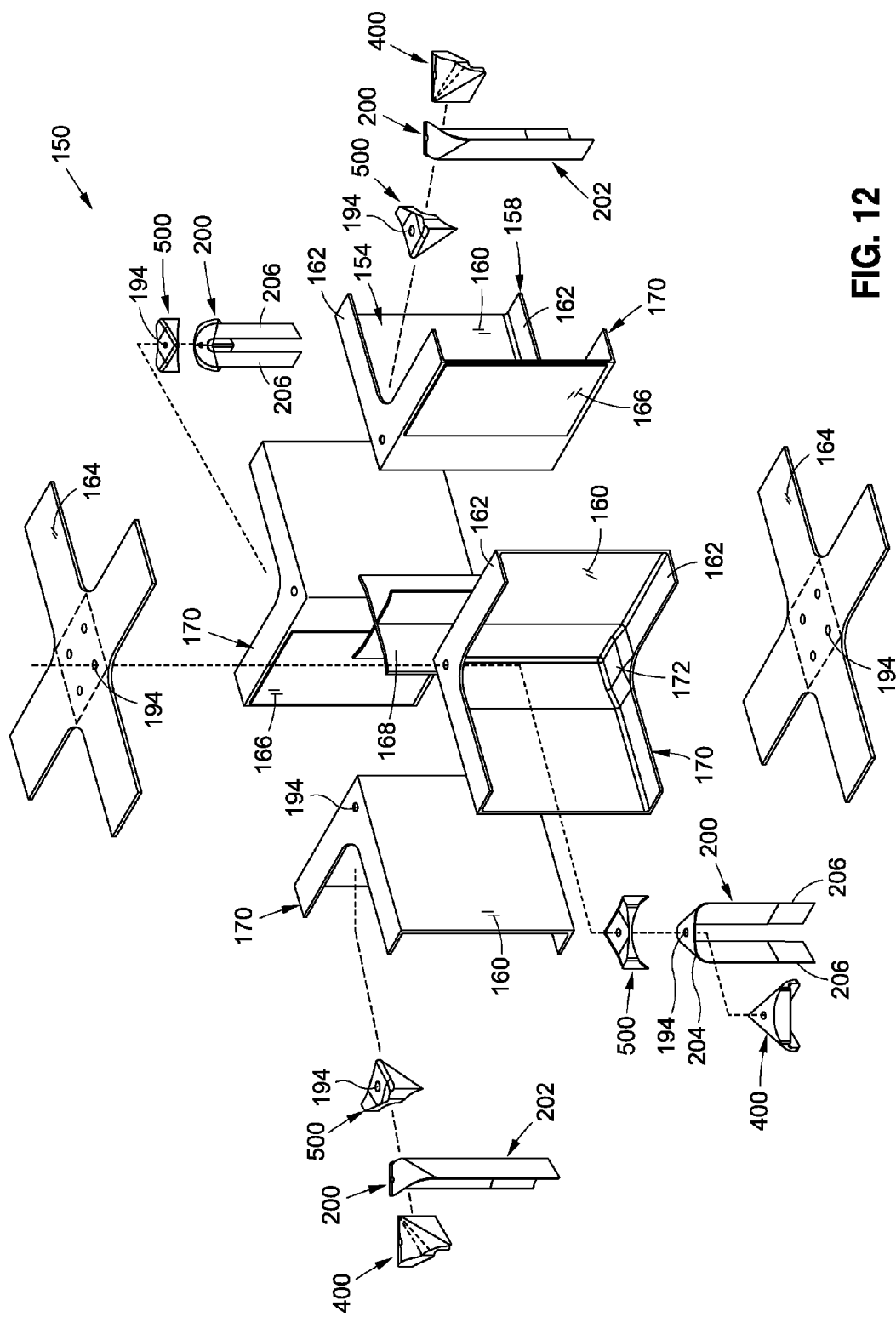
FIG. 12 is an exploded perspective view of the structural assembly of FIG. 11 and illustrating corner fittings installed within the structural assembly corners.

FIG. 12 is an exploded perspective view of the beam angle segments 170 that make up the structural assembly 150 of FIG. 11 and showing corner fittings 200 that may be installed within each one of the structural assembly corners 154. In the example shown, each beam angle segment 170 forms a 90° angle and has upper and lower flanges 162 interconnected by a vertical web 160. As indicated above, four of the beam angle segments 170 may be assembled in back-to-back relation with one another to form an orthogonal beam assembly 152. However, the beam angle segments 170 may be formed at non-90° angles such that when assembled, the beam angle segments define non-perpendicular angles relative to one another. The assembled beam angle segments 170 may function as nodes (not shown) for interconnecting a plurality of continuous beams (not shown) that may extend from other nodes. The interconnected beams may function as a structural assembly 150 such as a floor 122 (FIG. 2) or other structure.

In FIG. 12, the structural assembly 150 may include one or more beam caps 164 each having a cross shape. A beam cap 164 may be mounted to the flanges 162 on the upper side of the assembled beam angle segments 170 and a beam cap 164 may be mounted to the flanges 162 on the lower side of the assembled beam angle segments 170. The beam caps 164 may interconnect the flanges 162 of the back-to-back beam angle segments 170 and may transfer shear load 604 across the flanges 162. The beam assembly 152 may also include a cruciform 168 formed of sheet-metal material and/or composite sheet material and may be installed between the assembled beam angle segments 170. Such cruciform 168 may interconnect the webs 160 of the adjoining beam angle segments 170 and may transfer load across the webs 160 of the adjoining beam angle segments 170. In addition, the structural assembly 150 may include one or more beam shims 166 formed as sheets having a thickness equivalent to the thickness of the cruciform 168 to allow the back-to-back webs 160 of the assembled beam angle segments 170 to be fastened together without inducing out-of-plane bending in the webs 160 at locations where the back-to-back webs are fastened or bonded to one another.

FIG. 13 is a perspective view of a further example of a corner fitting 200 comprised of a strap 202 clamped between a male fitting 400 and a female fitting 500. FIG. 14 is an exploded perspective view of the corner fitting 200 of FIG. 13. Although a wrap 300 (FIGS. 5-8) is omitted from the corner fitting 200 of FIGS. 13-14, the corner fitting 200 may include a wrap 300 which may be formed as an L-shaped section and configured and installed as described above. The male fitting 400, female fitting 500, and strap 202 of FIG. 13-16 may be configured similar to the above-described male fitting 400, female fitting 500, and strap 202 of FIGS. 5-8. However, as described in greater detail below, the convex portion 402 of the male fitting 400 and concave portion 502 of the female fitting 500 of FIGS. 13-16 may be configured to sandwich or clamp a dry fiber preform version of the strap 202 which may be later infused with resin. In addition, the female fitting 500 shown in FIGS. 13-14 may include an female fitting end face 506 that may be contoured complementary to the underside of the flanges 162 as shown in FIGS. 11-12. The male fitting 400 shown in FIGS. 13-14 may have a male fitting end face 406 that may be inset such that the male fitting end face 406 is located nearer to the convex portion 402 than the male fitting end face 406 of the male fitting 400 shown in FIGS. 5-8.

Figure 16:
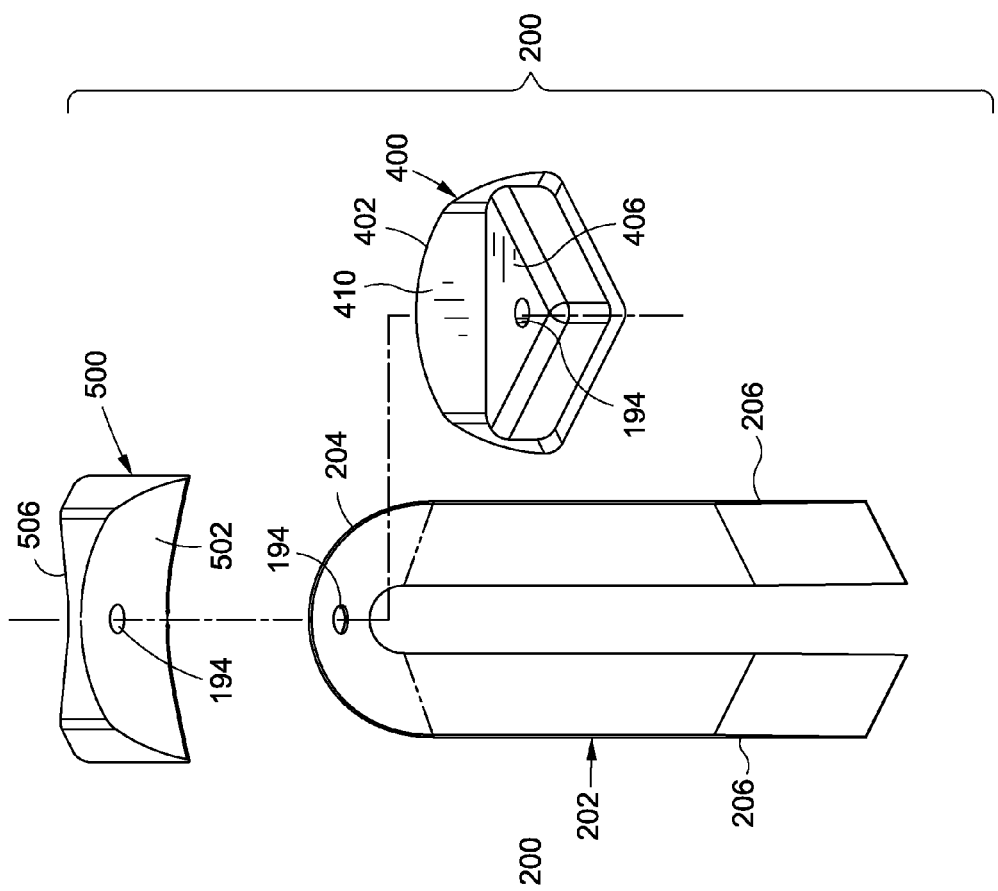
FIG. 16 is a perspective view of the corner fitting taken along line 16 of FIG. 15.
Figure 15:
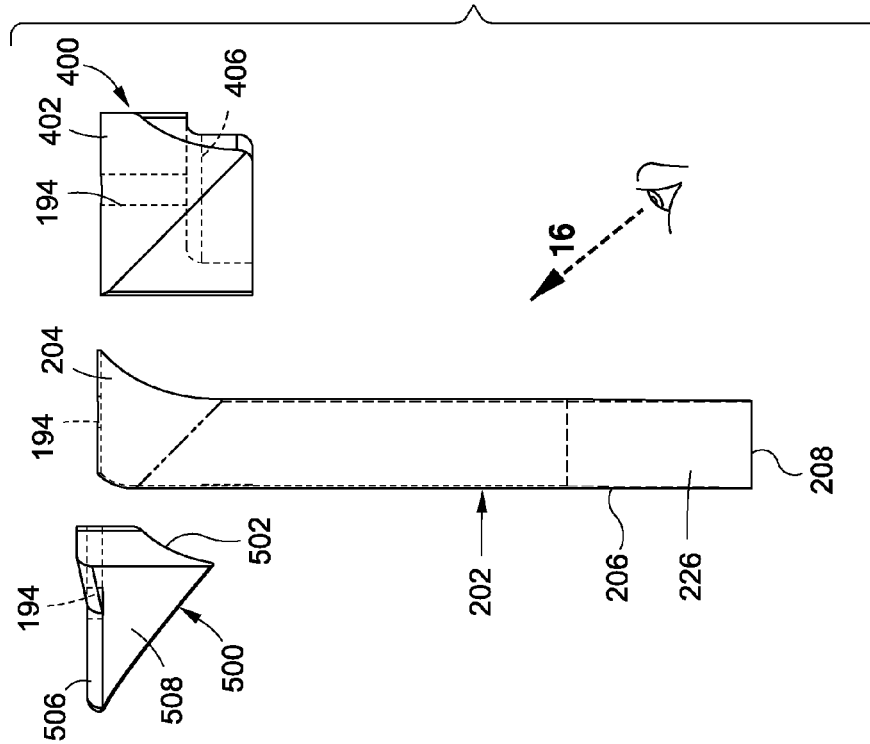
FIG. 15 is an exploded side view of the corner fitting of FIG. 13.

FIG. 15 is an exploded side view of the corner fitting 200 of FIG. 13. FIG. 16 is a perspective view of the corner fitting 200 of FIG. 15. As mentioned above, the convex portion 402 and the concave portion 502 of the respective male fitting 400 and female fitting 500 of FIGS. 13-16 may have a simplified semi-conical shape that is less complex than the angled semi-conical shape of the convex portion 402 and concave portion 502 shown in FIGS. 5-8. In this regard, when the corner fitting 200 of FIGS. 13-16 is viewed from the side as shown in FIG. 15, the interface between the convex portion 402 and the concave portion 502 defines a profile that is oriented perpendicularly relative to a lengthwise direction of the strap planar portions 206. The simplified configuration of the convex portion 402 and concave portion 502 in FIGS. 13-16 allows for the use of a dry fiber preform formed of one or more dry fiber unidirectional composite plies 226 (e.g., unidirectional tape—not shown) wherein the reinforcing fibers 228 (not shown) within each one of the unidirectional composite plies 226 may slip or move slightly along an axial direction relative to adjacent reinforcing fibers 228 in the same unidirectional composite ply 226 when the strap is formed into the contour of the semi-conical shape. The ability of the reinforcing fibers 228 in the strap radius portion 204 to slip axially relative to one another when the strap is formed into the semi-conical shape allows the reinforcing fibers 228 to be oriented parallel to both of the webs 160 while maintaining a straight path of the reinforcing fibers 228 (i.e., non-curved in an in-plane direction of the composite ply) in the strap radius portion 204 and into the strap planar portions 206. Advantageously, the ability of the reinforcing fibers 228 to axially slip while the strap radius portion 204 conforms to the simplified semi-conical shape provides a means to avoid interlaminar tension between adjacent reinforcing fibers 228 in a unidirectional composite ply 226 as may otherwise occur if the reinforcing fibers 228 in the strap planar portions 206 were oriented non-parallel to the direction of the tension load 600 (e.g., non-parallel to the lengthwise direction of the strap planar portion and/or non-parallel to the webs 160).

FIG. 17 is a longitudinal cross-sectional view of the structural assembly 150 of FIG. 11 and illustrating the tension fastener 196 fastening the corner fitting 200 to the flange 162 and the external fitting 180. FIG. 18 is a transverse cross-sectional view of the structural assembly 150 showing the strap planar portions 206 of each one of the corner fittings 200 coupled to the webs 160 of the assembled beam angle segments 170. In the example shown, the strap planar portions 206 may be formed of composite material and may be co-cured or co-bonded to the webs 160 of the assembled beam angle segments 170 which may also be formed of composite material. Advantageously, the semi-conical shape of the convex portion 402 and concave portion 502 of the respective male and female fitting 500 allows for the use of unidirectional composite plies 226 to efficiently transfer tension load 600 into the webs 160 of the beams 158. The composite corner fitting 200 provides improved strength efficiency and improved fatigue resistance relative to conventional metallic corner fittings 200. Furthermore, as indicated above, the fiber-reinforced polymer matrix construction of the corner fitting 200 including the vertical orientation of the reinforcing fibers 228 in the strap 202 may provide an increased level of energy-absorbing capability to the structural assembly 150 relative to the reduced energy-absorbing capability of metallic corner fittings when the structural assembly is under a high-strain-rate compression load 608 (FIG. 2). Such increased energy-absorbing capability provided by the composite corner fittings 200 may advantageously provide improved protection for passengers and cargo by attenuating kinetic energy during high-strain-rate compression loading of the structural assembly 150.

Figure 19:
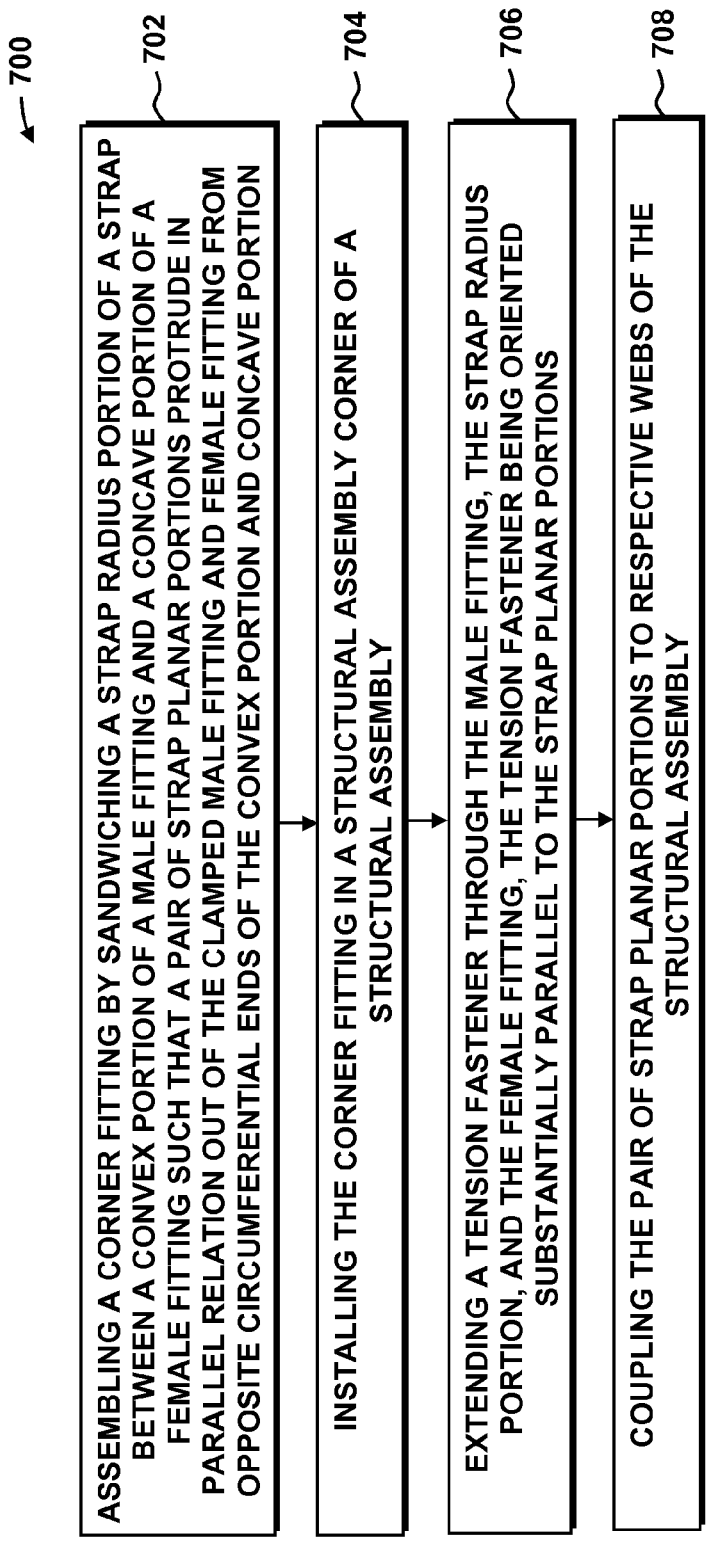
FIG. 19 is a flowchart having one or more operations that may be included in a method of forming a structural assembly.

FIG. 19 is a flowchart having one or more operations that may be included in a method 700 of forming a structural assembly 150. Step 702 of the method 700 may include providing a corner fitting 200 for installation in a structural assembly corner 154 of a structural assembly 150. As described above, the corner fitting 200 may be assembled by sandwiching a strap radius portion 204 of a strap 202 between a convex portion 402 of a male fitting 400 and a concave portion 502 of a female fitting 500. The convex portion 402 and concave portion 502 may be configured complementary to one another and may have a semi-conical shape. The strap 202 may include a pair of strap planar portions 206 which may protrude out of the assembled male fitting 400 and female fitting 500 from opposite circumferential ends 404, 504 of the convex portion 402 and concave portion 502. As indicated above, when clamped between the male fitting 400 and female fitting 500, the strap radius portion 204 assumes the semi-conical shape of the convex portion 402 and concave portion 502, and causes the strap planar portions 206 to be parallel to one another when viewed from a side (FIGS. 7-8 and 15-16) and non-parallel to one another and defining a strap interior angle 224 when viewed from an end or in transverse cross section (FIGS. 10 and 18). The method may include assembling or including a wrap 300 with the corner fitting 200. As described above, the wrap 300 (FIG. 3) may have an L-shaped cross-section formed by a pair of wrap planar portions 304 interconnected by a wrap bend radius 302. The pair of wrap planar portions 304 may be assembled in overlapping relation and/or interleaving relation with the pair of strap planar portions 206.

Step 704 of the method 700 of FIG. 19 may include installing the corner fitting 200 in a structural assembly corner 154 of a structural assembly 150. As indicated above, in an embodiment, the structural assembly 150 may be comprised of a plurality of intersecting beams 158 forming a beam assembly 152. In one example, the beams 158 may be floor beams 158 of a vehicle such as the floor beams 158 for a floor 122 of an aircraft cabin 114 or a cargo hold 120. However, as mentioned above, the structural assembly 150 may be provided in any one of a variety of configurations, and is not limited to a beam assembly 152 for a floor 122. In this regard, the presently-disclosed corner fittings 200 may be installed in any type of structural assembly 150 where it is desired to transfer tension load 600 into the webs 160 of one or more structural members via shear load 604 from the strap planar portions 206 into the webs 160.

The step of installing a corner fitting 200 into a structural assembly corner 154 may include placing a female fitting end face 506 of the female fitting 500 into abutting contact with an underside of the flange(s) 162 (FIG. 9) of one or more structural members that define the structural assembly corner 154. In some examples, the female fitting end face 506 may be contoured or configured complementary to an underside of the flanges 162. FIG. 5 illustrates a female fitting end face 506 having a planar shape configured for placing in abutting contact with a planar underside of the flange 162 in FIG. 9. FIG. 13 illustrates a contoured female fitting end face 506 configured complementary to a contoured underside of the flange 162 in FIG. 17. The method may additionally include placing at least one of the female fitting side surfaces 508 in abutting contact with the one or both of the respective webs 160 of the structural assembly corner 154. However, in some embodiments, one or both of the female fitting side surfaces 508 may be disposed in non-contacting relation to the respective webs 160 of a structural assembly corner 154.

Step 706 of the method 700 of FIG. 19 may include extending at least one tension fastener 196 through the male fitting 400, the strap radius portion 204, and the female fitting 500 of each one of the corner fittings 200. In an example, a tension fastener 196 may be oriented substantially parallel (e.g., ±10°) to the strap planar portion length 214. However, it is contemplated that the tension fastener 196 may be oriented non-parallel (e.g., greater than 10°) relative to the orientation of the strap planar portion length 214, while allowing the strap planar portions 206 to effectively transfer (e.g., via shearing) the tension load 600 into the webs 160 of the beams 158. For a strap 202 formed of composite material such as unidirectional composite plies 226, the tension fastener 196 may be oriented substantially parallel to the orientation 230 of at least some of the reinforcing fibers 228 which, in some examples, may extend continuously along a lengthwise direction of the strap 202 between opposing strap end edges 208. The tension fastener 196 may extend through at least one flange 162 of at least one of the beams 158 that make up the structural assembly 150.

The method may include coupling, using the tension fastener 196, at least one external fitting 180 to a corner fitting 200 installed in a structural assembly corner 154. As indicated above, an external fitting 180 may be mounted on top of the structural assembly 150. For example, FIG. 3-4 illustrate a bathtub fitting 182 mounted on top of the flanges 162 of the intersecting beams 158. However, in other embodiments, the structural assembly 150 may be devoid of any external fittings 180, and the tension fastener 196 may function to couple one or more of the flanges 162 of the structural assembly 150 to the corner fitting 200 to improve the resistance of the flanges 162 to bending or uploads on the flanges 162.

Step 708 of the method 700 of FIG. 19 may include coupling the pair of strap planar portions 206 to the respective webs 160 of a structural assembly corner 154. In an embodiment, the strap planar portions 206 may be placed in directly abutting contact with the webs 160 and may be coupled to the webs 160 by adhesively bonding, co-bonding, co-curing, and/or mechanically fastening. In other examples, the corner fitting 200 may include a wrap 300 having wrap planar portions 304 which may be positioned on the respective strap interior surfaces 220 such that when the corner fitting 200 is installed in a structural assembly corner 154, the wrap planar portions 304 are placed in direct abutting contact with the webs 160 and may be coupled to the webs 160 by adhesively bonding, co-bonding, co-curing, and/or mechanically fastening.

It should be noted that the installation of the one or more tension fasteners 196 coupling the corner fitting 200 to the one or more flanges 162 and/or external fittings 180 may be performed before or after the strap planar portions 206 are coupled (e.g., bonded, co-bonded, co-cured, and/or mechanically fastened) to the webs 160 of the structural assembly 150. As indicated above, the coupling of the strap planar portions 206 to the webs 160 may include co-curing or co-bonding the strap planar portions 206 to the webs 160. For example, the beams 158 of a structural assembly 150 may be formed of uncured composite material such as prepreg composite plies 226, and the strap 202, male fitting 400, and/or female fitting 500 may likewise be formed of prepreg composite plies 226. However, in other examples, the male fitting 400 and female fitting 500 may be formed of chopped fibers (not shown) embedded in a polymer resin matrix (not shown). The uncured corner fitting 200 may be assembled such that the strap radius portion 204 is clamped between the convex portion 402 of the male fitting 400 and the concave portion 502 of the female fitting 500.

An uncured corner fitting 200 may be installed in a structural assembly corner 154 and a tension fastener 196 may be installed in the tension fastener hole 194 extending through the corner fitting 200, the flange 162, and/or external fitting 180. The strap planar portions 206 may be positioned against the webs 160. At least a portion of the structural assembly 150 may be vacuum-bagged and compaction pressure and heat may be applied to the structural assembly 150 and/or the corner fittings 200 for co-curing the structural assembly 150 and the corner fittings 200. Alternatively, the corner fitting 200 may be precured prior to installation in an uncured structural assembly corner 154. At least a portion of the structural assembly 150 containing the corner fitting 200 may be vacuum-bagged so that at least the strap planar portions 206 of the corner fitting 200 may be co-bonded to the structural assembly 150 during curing of the structural assembly 150.

In a still further embodiment, an uncured corner fitting 200 may be installed in a cured structural assembly corner 154. The portion of the structural assembly 150 containing the corner fitting 200 may be vacuum-bagged and the corner fitting 200 may be cured as the strap planar portions 206 are co-bonded to the webs 160 of the structural assembly 150. Even further, the present disclosure contemplates that the strap 202 may be formed of metallic material and the strap planar portions 206 may be mechanically fastened to the respective webs 160 of a structural assembly 150 formed of composite material and/or metallic material. In each one of the above disclosed embodiments, at least one tension fastener 196 may couple the male fitting 400, female fitting 500, and strap radius portion 204 to at least one flange 162 and/or an external fitting 180 that may be mounted to a structural assembly 150. As indicated above, the tension fastener 196 may advantageously transfer tension load 600 into the strap 202 which, in turn, may efficiently shear the tension load 600 into the webs 160 of the structural assembly 150.

Additional modifications and improvements of the present disclosure may be apparent to those of ordinary skill in the art. Thus, the particular combination of parts described and illustrated herein is intended to represent only certain embodiments of the present disclosure and is not intended to serve as limitations of alternative embodiments or devices within the spirit and scope of the disclosure.

What is claimed is:

1. A corner fitting, comprising:
a male fitting having a convex portion;
a female fitting having a concave portion configured complementary to the convex portion;
a strap having a strap radius portion and a pair of strap planar portions extending from opposite ends of the strap radius portion, the pair of strap planar portions each defining a flat longitudinal surface configured to be attached to a beam, the pair of strap planar portions being parallel to one another when the strap radius portion is clamped or sandwiched between the convex portion and the concave portion and the corner fitting is viewed along a direction orthogonal to the longitudinal surface of either one of the strap planar portions and non-parallel to one another when the corner fitting is viewed along a direction parallel to the longitudinal surface of either one of the strap planar portions; and
the pair of strap planar portions protruding outwardly in a same direction from opposing circumferential ends of the convex portion and concave portion when the strap radius portion is clamped or sandwiched between the convex portion and the concave portion.

2. The corner fitting of claim 1, wherein:
the convex portion and the concave portion have a semi-conical shape.

3. The corner fitting of claim 2, wherein:
the semi-conical shape is such that when the strap radius portion is clamped between the convex portion and the concave portion, a length of a strap inner side edge is equivalent to the length of a strap outer side edge.

4. The corner fitting of claim 1, further including:
at least one tension fastener hole extending through the male fitting, the female fitting, and the strap radius portion and oriented substantially parallel to the pair of strap planar portions.

5. The corner fitting of claim 4, wherein:
the strap is formed of at least one unidirectional composite ply having reinforcing fibers oriented substantially parallel to an orientation of the tension fastener hole.

6. The corner fitting of claim 1, further including:
a wrap including a pair of wrap planar portions forming an L-shaped cross-section when viewed in transverse cross-section and defining a wrap interior angle substantially matching a strap interior angle of the strap planar portions; and
the wrap planar portions interleaved or overlaid with the strap planar portions.

7. The corner fitting of claim 1, wherein:
at least one of the male fitting and the female fitting is formed of fiber-reinforced polymer matrix material.

8. The corner fitting of claim 1, wherein:
the male fitting, the strap, and the female fitting are one of co-bonded and co-cured together.

9. A structural assembly, comprising:
a beam assembly having two or more beams intersecting one another forming a beam assembly corner, the beams each having a web and a flange;
a corner fitting installed in the beam assembly corner and including:
a male fitting having a convex portion;
a female fitting having a concave portion configured complementary to the convex portion;
a strap having a strap radius portion and a pair of strap planar portions extending from opposite ends of the strap radius portion, the pair of strap planar portions each defining a flat longitudinal surface configured to be attached to a beam, the pair of strap planar portions being parallel to one another when the strap radius portion is clamped or sandwiched between the convex portion and the concave portion and the corner fitting is viewed along a direction orthogonal to the longitudinal surface of either one of the strap planar portions and non-parallel to one another when the corner fitting is viewed along a direction parallel to the longitudinal surface of either one of the strap planar portions, the pair of strap planar portions protruding outwardly in a same direction from opposing circumferential ends of the convex portion and concave portion when the strap radius portion is clamped or sandwiched between the convex portion and the concave portion; and a tension fastener extending through the male fitting, the strap radius portion, and the female fitting and into a flange of at least one of the beams and oriented substantially parallel to each web of the beams.

10. The structural assembly of claim 9, wherein:
the convex portion and the concave portion have a semi-conical shape.

11. The structural assembly of claim 9, wherein:
the strap is formed of at least one unidirectional composite ply having reinforcing fibers oriented substantially parallel to the tension fastener.

12. The structural assembly of claim 9, further including:
a wrap including a pair of wrap planar portions forming an L-shaped cross-section when viewed in transverse cross-section and defining a wrap interior angle substantially matching a strap interior angle of the strap planar portions; and
the wrap planar portions being at least one of interleaved or overlaid with the strap planar portions.

13. The structural assembly of claim 9, wherein:
the beams are floor beams of a vehicle.

14. The structural assembly of claim 13, wherein:
the vehicle is an aircraft.

15. The structural assembly of claim 9, wherein:
the corner fitting is one of co-cured and co-bonded with the beam assembly.

16. The structural assembly of claim 9, further including:
an external fitting mounted on top of at least one flange of the beam assembly and coupled to the corner fitting via the tension fastener.

17. A method of forming a structural assembly, comprising the steps of:
assembling a corner fitting by sandwiching a strap radius portion of a strap between a convex portion of a male fitting and a concave portion of a female fitting such that a pair of strap planar portions protrude out of the male fitting and the female fitting from opposite circumferential ends of the convex portion and concave portion, the pair of strap planar portions each defining a flat longitudinal surface configured to be attached to a beam, the pair of strap planar portions being parallel to one another when viewed along a direction orthogonal to the longitudinal surface of either one of the strap planar portions and non-parallel to one another when viewed along a direction parallel to the longitudinal surface of either one of the strap planar portions; and installing the corner fitting in a structural assembly corner defined by intersecting beams;

extending a tension fastener through the male fitting, the strap radius portion, the female fitting and at least one flange of the intersecting beams; and coupling the pair of strap planar portions to a respective pair of webs of the intersecting beams.

18. The method of claim 17, wherein:
the strap radius portion has a semi-conical shape when clamped between the convex portion and the concave portion.

19. The method of claim 17, wherein:
the strap is formed of at least one unidirectional composite ply having reinforcing fibers oriented substantially parallel to the tension fastener.

20. The method of claim 17, wherein:
the tension fastener is oriented substantially parallel to the webs of the intersecting beams.

21. The method of claim 17, wherein the step of assembling the corner fitting includes:
one of overlapping and interleaving a wrap with the strap planar portions.

22. The method of claim 17, wherein the step of coupling the strap planar portions to the webs includes:
at least one of co-curing and co-bonding the strap planar portions to the webs.

23. The method of claim 17, wherein the step of installing the corner fitting includes:
placing an end face of the female fitting in abutting contact with an underside of at least one flange of the intersecting beams.

24. The method of claim 17, further including:
coupling the tension fastener to an external fitting mounted on top of at least one flange of the intersecting beams.

* * * * *